US009607323B2

(12) United States Patent
Masuko et al.

(10) Patent No.: US 9,607,323 B2
(45) Date of Patent: Mar. 28, 2017

(54) GOODS INFORMATION PROVIDING SYSTEM, APPARATUS, METHOD AND INFORMATION STORAGE MEDIUM

(71) Applicant: RAKUTEN, INC., Shinagawa-ku, Tokyo (JP)

(72) Inventors: Soh Masuko, Shinagawa-ku (JP); Shigaku Iwabuchi, Tsukuba (JP); Shinichiro Tosa, Ichikawa (JP); Jiro Tanaka, Ushiku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/044,461

(22) Filed: Oct. 2, 2013

(65) Prior Publication Data
US 2014/0299659 A1 Oct. 9, 2014

(30) Foreign Application Priority Data
Apr. 4, 2013 (JP) ................................. 2013-078630

(51) Int. Cl.
*G06Q 30/02* (2012.01)
*G06Q 30/06* (2012.01)

(52) U.S. Cl.
CPC ..... *G06Q 30/0281* (2013.01); *G06Q 30/0639* (2013.01)

(58) Field of Classification Search
CPC .... G06Q 30/0631; G06Q 50/01; G06Q 30/06; G06Q 30/02; G06Q 30/0281; G06Q 30/0639; G06N 5/048
(Continued)

(56) References Cited

U.S. PATENT DOCUMENTS

2007/0185648 A1 8/2007 Gretton
2007/0225902 A1 9/2007 Gretton et al.
(Continued)

FOREIGN PATENT DOCUMENTS

JP GB 2336925 A * 11/1999 ......... G06K 17/0022
JP 2002117221 A 4/2002
(Continued)

OTHER PUBLICATIONS

Japanese Office Action issued in Japanese Patent Application No. 2013078630 dated Dec. 10, 2013.

*Primary Examiner* — Sonji Johnson
(74) *Attorney, Agent, or Firm* — Sughrue Mion, PLLC

(57) ABSTRACT

Provided is a goods information providing system, including: a first position acquisition section (4) for acquiring from a position information DB (31) position information on goods specified by a shelf ID read by a reading unit (22); a related goods extraction section (5) for extracting from a related goods information DB (33) a related goods related to the goods specified by the shelf ID; a second position acquisition section (6) for acquiring from the position information DB (31) position information on the extracted related goods; a recommended goods determination section (8) for determining, as recommended goods, from among the extracted related goods, the related goods selected based on a position of the goods acquired by the first position acquisition section (4) and a position of the related goods acquired by the second position acquisition section (6); and an informing unit (23) for informing of information on the determined recommended goods.

15 Claims, 30 Drawing Sheets

(58) Field of Classification Search
USPC .......... 705/26.7, 14.53, 2; 706/52; 709/204
See application file for complete search history.

(56) References Cited

U.S. PATENT DOCUMENTS

| | | | |
|---|---|---|---|
| 2010/0299062 A1 | 11/2010 | Gretton | |
| 2012/0123673 A1* | 5/2012 | Perks et al. | ................... 701/426 |
| 2013/0218721 A1* | 8/2013 | Borhan et al. | ............. 705/26.41 |

FOREIGN PATENT DOCUMENTS

| | | | | |
|---|---|---|---|---|
| JP | 2003006512 A | 1/2003 | | |
| JP | EP 1826717 A1 * | 8/2007 | ............ | G06Q 30/02 |
| JP | 2007529735 A | 10/2007 | | |
| JP | 2009237924 A | 10/2009 | | |
| JP | 2010170229 A | 8/2010 | | |
| JP | 2012-185576 A | 9/2012 | | |
| JP | 2012185576 A | 9/2012 | | |

* cited by examiner

| SHELF ID | GOODS ID | GOODS POSITION |
|---|---|---|
| A11 | 001 | X4,Y2,Z1 |
| A12 | 002 | X6,Y6,Z1 |
| A13 | 003 | X6,Y8,Z1 |
| A14 | 004 | X3,Y5,Z1 |
| A15 | 005 | X9,Y9,Z1 |
| A16 | 006 | X5,Y3,Z3 |
| A17 | 007 | X5,Y6,Z3 |
| A18 | 002 | X9,Y7,Z2 |
|  |  |  |
| F21 | 011 | X5,Y8,Z2 |
| F22 | 012 | X3,Y5,Z2 |
| F23 | 013 | X4,Y6,Z2 |
| F24 | 014 | X1,Y5,Z4 |
| F25 | 015 | X5,Y2,Z4 |
|  |  |  |

FIG.5

| GOODS ID | GOODS NAME | PRICE | SHELF ID |
|---|---|---|---|
| 001 | SHOES | 5000 YEN | A11 |
| 002 | SHOE POLISH SET | 1000 YEN | A12,A18 |
| 003 | SHOE SPRAY | 600 YEN | A13 |
| 004 | SHOELACE | 300 YEN | A14 |
| 005 | DETERGENT | 500 YEN | A15 |
| 006 | BAG | 3000 YEN | A16 |
| 007 | BELT | 1500 YEN | A17 |
|  |  |  |  |
| 011 | PC | 100000 YEN | F21 |
| 012 | PC SOFTWARE | 3000 YEN | F22 |
| 013 | RECORDING MEDIUM | 500 YEN | F23 |
| 014 | DESK | 15000 YEN | B24 |
| 015 | CHAIR | 10000 YEN | F25 |
|  |  |  |  |

| GOODS ID | GOODS ID OF RELATED GOODS |
|---|---|
| 001 (SHOES) | 002(SHOE POLISH SET) 003(SHOE SPRAY) 004(SHOELACE) 005(DETERGENT) 006(BAG) 007(BELT) |
| 011(PC) | 012(PC SOFTWARE) 013(RECORDING MEDIUM) 014(DESK) 015(CHAIR) |
| | |

FIG.9

| GOODS ID OF RELATED GOODS | SHELF ID | GOODS POSITION |
|---|---|---|
| 002(SHOE POLISH SET) | A12 | E1 = (X6,Y6,Z1) |
| 003(SHOE SPRAY) | A13 | E2 = (X6,Y8,Z1) |
| 004(SHOELACE) | A14 | E3 = (X3,Y5,Z1) |

GOODS INFORMATION PROVIDING SYSTEM, APPARATUS, METHOD AND INFORMATION STORAGE MEDIUM

CROSS-REFERENCE TO RELATED APPLICATION

The present application claims priority from Japanese application JP 2013-078630 filed on Apr. 4, 2013, the content of which is hereby incorporated by reference into this application.

BACKGROUND OF THE INVENTION

1. Field of the Invention

The present invention relates to a system for providing a customer with information on goods, and more particularly, to a goods information providing system for providing a customer during shopping in an actual store (real store) with information on goods, a goods information providing apparatus, a goods information providing method, and an information storage medium.

2. Description of the Related Art

Up to now, there has been proposed a system for guiding a customer during shopping in a real store to a displayed position of desired goods by the customer.

For example, in Japanese Patent Application Laid-open No. 2012-185576, there is disclosed a shopping assist system for assisting the shopping of the customer in the store by allowing the customer to carry the information terminal device and by guiding the customer to the displayed position of the desired goods by the customer. In this shopping assist system, if the goods to buy are registered in the information terminal device by the customer, the information terminal device acquires the position information on the registered goods and guides the customer to the shortest route from the current position of the customer to the displayed position of the goods based on the position information.

SUMMARY OF THE INVENTION

However, in the above-mentioned conventional technology, the customer is guided to the displayed position of the goods to buy that have been registered by the customer himself/herself. Accordingly, information on goods that have not been registered by the customer is not provided. Therefore, for example, there has been such a problem that the customer may fail to buy the goods that the customer has forgotten to register, the goods that the customer does not desire to buy but the customer may as well or should buy, or other such goods when visiting the store and the customer thus needs to visit the store again.

The present invention has been made in view of the above-mentioned problem, and has an object to provide a goods information providing system capable of reducing a loss of a customer's opportunity to buy in a real store at the time when the customer visits the real store, a goods information providing apparatus, a goods information providing method, and an information storage medium.

In order to solve the above-mentioned problem, according to one embodiment of the present invention, there is provided a goods information providing system, including: reading means for reading, from an information readable medium disposed along with goods in a real store, specifying information for specifying the goods and a position of the goods; first position acquisition means for acquiring position information on the goods specified by the specifying information read by the reading means; related goods extraction means for extracting, from related goods information storage means for storing identification information on the goods and identification information on related goods related to the goods in association with each other, the identification information on the related goods related to the goods specified by the specifying information read by the reading means; second position acquisition means for acquiring, from position information storage means for storing the identification information on the goods and the position information on the goods in association with each other, position information that is associated with the identification information on the related goods extracted by the related goods extraction means; recommended goods determination means for determining, as recommended goods, from among the related goods that are each identified by the identification information extracted by the related goods extraction means, the related goods that is selected based on the position of the goods corresponding to the position information acquired by the first position acquisition means and a position of the related goods corresponding to the position information acquired by the second position acquisition means; and informing means for informing of information on the recommended goods determined by the recommended goods determination means.

Further, in the above-mentioned goods information providing system, the recommended goods determination means may be further configured to determine, as the recommended goods, from among a plurality of the selected related goods, the related goods selected based on relative positions of the plurality of the selected related goods in the real store.

Further, in the above-mentioned goods information providing system, the recommended goods determination means may be further configured to determine, as the recommended goods, from among a plurality of the selected related goods, one of the related goods disposed in proximity to one another in the real store and related goods disposed in a region in the real store in which the related goods are distributed with a highest density.

Further, in the above-mentioned goods information providing system, the recommended goods determination means may be further configured to determine, as the recommended goods, from among the selected related goods, the related goods whose price satisfies a condition based on a discount amount of the goods specified by the specifying information.

Further, in the above-mentioned goods information providing system, after the informing means informs of the information on the recommended goods, when the reading means reads second specifying information for specifying another piece of goods different from the recommended goods and a position of the another piece of goods from an information readable medium disposed along with the another piece of goods: the first position acquisition means may acquire position information on the another piece of goods that is specified by the second specifying information read by the reading means; the second position acquisition means may acquire position information on the recommended goods from the position information storage means; and the recommended goods determination means may determine, as new recommended goods, from among the recommended goods, the related goods selected based on the position of the another piece of goods corresponding to the position information acquired by the first position acquisition means and a position of the recommended goods corresponding to the position information acquired by the second position acquisition means.

Further, in the above-mentioned goods information providing system, in the related goods information storage means, the related goods may be registered in advance based on a purchase history of a customer.

Further, in the above-mentioned goods information providing system, the recommended goods determination means may select, from among the related goods that are each identified by the identification information extracted by the related goods extraction means, the related goods to be determined as the recommended goods based on one of a linear distance and a distance from the position of the goods corresponding to the position information acquired by the first position acquisition means to the position of the related goods corresponding to the position information acquired by the second position acquisition means.

Further, in the above-mentioned goods information providing system, the informing means may display an in-store map indicating the position of the goods specified by the specifying information and a position of the recommended goods determined by the recommended goods determination means.

Further, the above-mentioned goods information providing system may further include: route determination means for searching for a route from the position of the goods specified by the specifying information to a position of the recommended goods based on the position of the goods and the position of the recommended goods to determine a guidance route; and selection means for selecting at least one specific related goods based on at least one of the goods and the recommended goods. The route determination means may determine, when a plurality of routes are retrieved as the route and a difference between distances of the plurality of routes falls within a predetermined range, the route passing through a largest number of positions of the at least one specific related goods as the guidance route, from among the plurality of routes. The informing means may display an in-store map indicating the guidance route determined by the route determination means.

Further, in the above-mentioned goods information providing system, the information readable medium may include any one of a barcode, a QR code, and an AR marker, and may be disposed for each of goods on a display shelf on which the each of the goods is displayed.

Further, in the above-mentioned goods information providing system, the specifying information may be goods position information for specifying the position of the goods in the real store.

In order to solve the above-mentioned problem, according to one embodiment of the present invention, there is provided a goods information providing apparatus, which is to be connected via a network to an information terminal device that is portable and is to be used by a customer who visits a real store selling goods, the goods information providing apparatus including: reception means for receiving specifying information from the information terminal device that has read, from an information readable medium disposed along with the goods in the real store, the specifying information for specifying the goods and a position of the goods; first position acquisition means for acquiring position information on the goods specified by the specifying information; related goods extraction means for extracting, from related goods information storage means for storing identification information on the goods and identification information on related goods related to the goods in association with each other, the identification information on the related goods related to the goods specified by the specifying information; second position acquisition means for acquiring, from position information storage means for storing the identification information on the goods and the position information on the goods in association with each other, position information that is associated with the identification information on the related goods extracted by the related goods extraction means; recommended goods determination means for determining, as recommended goods, from among the related goods that are each identified by the identification information extracted by the related goods extraction means, the related goods selected based on the position of the goods corresponding to the position information acquired by the first position acquisition means and a position of the related goods corresponding to the position information acquired by the second position acquisition means; and transmission means for transmitting, to the information terminal device, informing data for informing of information on the recommended goods.

In order to solve the above-mentioned problem, according to one embodiment of the present invention, there is provided a goods information providing method, including: a reading step of reading, from an information readable medium disposed along with goods in a real store, specifying information for specifying the goods and a position of the goods; a first position acquisition step of acquiring position information on the goods specified by the specifying information read in the reading step; a related goods extraction step of extracting, from related goods information storage means for storing identification information on the goods and identification information on related goods related to the goods in association with each other, the identification information on the related goods related to the goods specified by the specifying information read in the reading step; a second position acquisition step of acquiring, from position information storage means for storing the identification information on the goods and the position information on the goods in association with each other, position information that is associated with the identification information on the related goods extracted in the related goods extraction step; a recommended goods determination step of determining, as recommended goods, from among the related goods that are each identified by the identification information extracted in the related goods extraction step, the related goods selected based on the position of the goods corresponding to the position information acquired in the first position acquisition step and a position of the related goods corresponding to the position information acquired in the second position acquisition step; and an informing step of informing of information on the recommended goods determined in the recommended goods determination step.

In order to solve the above-mentioned problem, according to one embodiment of the present invention, there is provided a computer-readable storage medium having stored thereon a goods information providing program for causing a computer to function as: first position acquisition means for acquiring position information on goods that is specified by specifying information for specifying the goods and a position of the goods, the specifying information being included in an information readable medium disposed along with the goods in a real store; related goods extraction means for extracting, from related goods information storage means for storing identification information on the goods and identification information on related goods related to the goods in association with each other, the identification information on the related goods related to the goods specified by the specifying information; second position acquisition means for acquiring, from position information storage means for storing the identification information on the goods and the position information on the goods in association with each other, position information that is associated with the identification information on the related goods extracted by the related goods extraction means; and recommended goods determination means for determining, as recommended goods, from among the related goods that are each identified by the identification information extracted by the related goods extraction means, the related goods selected based on the position of the goods corresponding to the position information acquired by the first position acquisition means and a position of the related goods corresponding to the position information acquired by the second position acquisition means. The storage medium may be a CD-ROM, a DVD-ROM, or the like.

According to one embodiment of the present invention, which can provide the information on the goods (related goods) related to the goods displayed in front of the customer, it is possible to reduce the loss of the customer's opportunity to buy at the time when the customer visits the store. According to one embodiment of the present invention, which determines the recommended goods in consideration of the position of the goods, it is also possible to obtain an effect of reducing the user's time and effort to move in the store in addition to the above-mentioned effect.

BRIEF DESCRIPTION OF THE DRAWINGS

In the accompanying drawings:

FIG. 3 is a diagram illustrating an example of a position information DB;

FIG. 5 is a diagram illustrating an example of a goods information DB;

FIG. 6 is a diagram illustrating an example of a related goods information DB;

FIG. 9 is a diagram illustrating an example of a related goods list;

DETAILED DESCRIPTION OF THE INVENTION

First Embodiment

Referring to the accompanying drawings, a description is now given of a first embodiment of the present invention.

Figure 1:
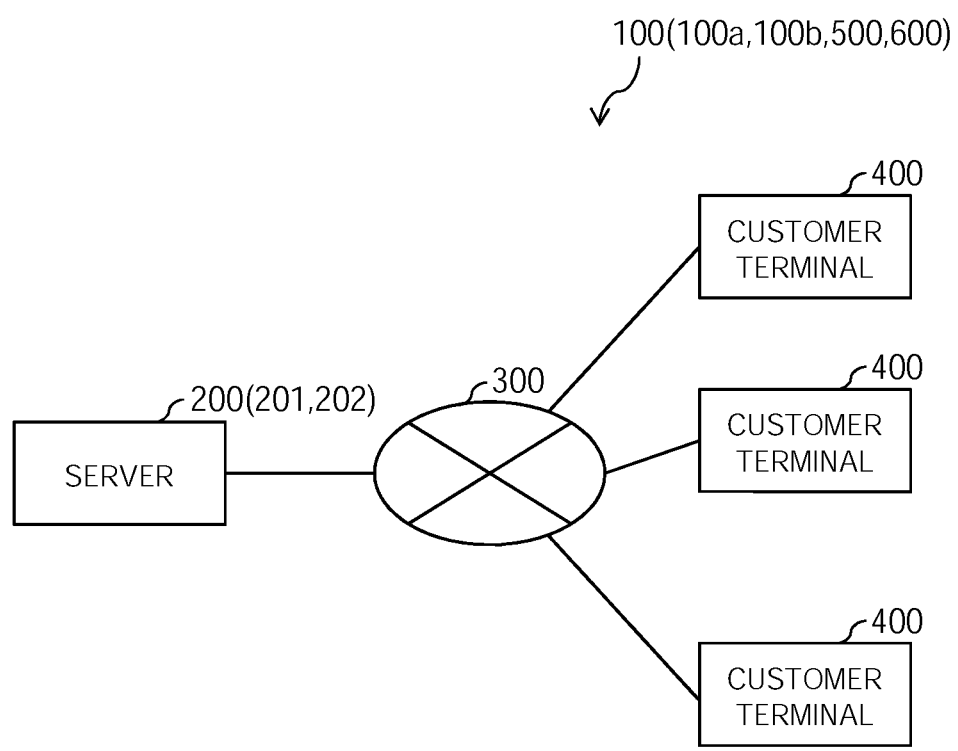
FIG. 1 is a diagram illustrating a schematic configuration of a goods information providing system according to each of first to third embodiments of the present invention.

FIG. 1 is a diagram illustrating a schematic configuration of a goods information providing system according to the first embodiment. As illustrated in FIG. 1, the goods information providing system, which is denoted by reference numeral 100, includes a server 200 (goods information providing apparatus) and a plurality of customer terminals 400 (information terminal devices) that are connected to the server 200 via a network 300 such as the Internet or a virtual private network (VPN). Note that, in the following description, one customer terminal 400 connected to the server 200 via the network 300 is taken as an example.

Figure 2:
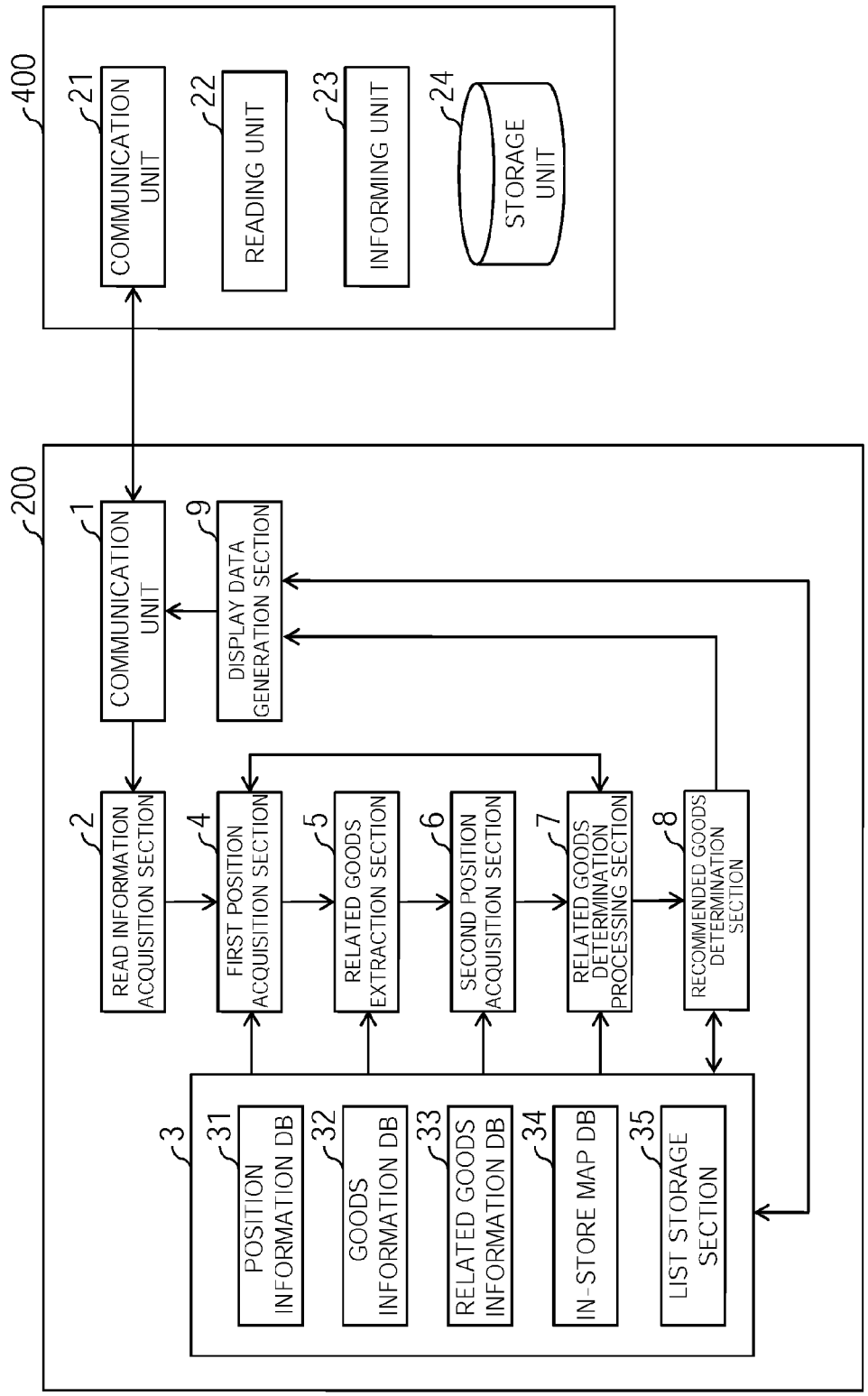
FIG. 2 is a block diagram illustrating a specific configuration of the goods information providing system according to the first embodiment.

FIG. 2 is a block diagram illustrating a specific configuration of the goods information providing system 100. The customer terminal 400 includes a communication unit 21, a reading unit 22 (reading means), an informing unit 23 (informing means), and a storage unit 24. The customer terminal 400 is the information terminal device such as a cellular phone or a head mounted display (HMD). The customer terminal 400 may be a terminal owned by a customer using an real store (hereinafter referred to as "store") or may be a terminal that is owned by the store and to be lent to the customer. Alternatively, the customer terminal 400 may be a shopping cart owned by the store.

The communication unit 21 is a communication interface. The communication unit 21 performs communications such as transmission and reception of data to/from the server 200 via the network 300.

The reading unit 22 is an information reading device such as a camera. The reading unit 22 recognizes a medium (medium from which information is readable (hereinafter referred to as "information readable medium")) on which an identification mark such as a barcode, a QR code (trademark), or an augmented reality (AR) marker attached to a display shelf or goods is indicated, to thereby read specifying information for specifying the goods and the position thereof from the medium. The specifying information may be any one of shelf position information for specifying the position in the store of the display shelf on which the goods are displayed, shelf identification information for specifying the display shelf on which the goods are displayed, goods position information for specifying the position of the goods in the store, and goods identification information for specifying the goods. In the following description, the shelf identification information for specifying the display shelf (hereinafter referred to as "shelf ID") is taken as an example of the specifying information. The reading unit 22 may execute a reading operation in response to the customer's operation, or may execute the reading operation automatically when recognizing the medium. The customer terminal 400 transmits the shelf ID read by the reading unit 22 to the server 200 via the communication unit 21. Note that, a piece of paper or sticker on which the price of the goods is indicated is conceivable as the medium.

The informing unit 23 includes a display panel. The informing unit 23 displays goods information, shelf information, an in-store map, and others, and presents various kinds of information to the customer using the customer terminal 400. Note that, the informing unit 23 may include a speaker and inform the customer of the various kinds of information via voice navigation.

The storage unit 24 stores the shelf ID read by the reading unit 22 and various kinds of information received from the server 200.

The server 200 includes a communication unit 1 (communication means), a read information acquisition section 2 (read information acquisition means), a storage unit 3 (storage means), a first position acquisition section 4 (first position acquisition means), a related goods extraction section 5 (related goods extraction means), a second position acquisition section 6 (second position acquisition means), a related goods determination processing section 7 (related goods determination processing means), a recommended goods determination section 8 (recommended goods determination means), and a display data generation section 9 (display data generation means).

The server 200 provides information on the goods sold by the store, and may be provided inside the store or may be provided outside the store as well. Further, respective functions of the components constituting the server 200 may be assigned to a plurality of computers, and the plurality of computers may be connected to one another via the network to constitute the goods information providing system 100. Note that, the component relating to the function assigned to each computer may be arbitrarily set. Therefore, for example, the read information acquisition section 2 and the first position acquisition section 4 may be provided to an external computer connected to the server 200 via the network. Further, the respective components constituting the server 200 may be provided to the customer terminal 400. Specifically, among the respective components constituting the goods information providing system 100, the reading unit 22 and the informing unit 23 may be provided to the customer terminal 400 and other components may be provided to the customer terminal 400 or may be provided to the server 200 as well.

The components constituting the server 200 are implemented by a control unit of the goods information providing system 100 executing a program installed on the goods information providing system 100, which is a computer. This program is provided to the goods information providing system 100 via, for example, a computer-readable recording medium such as a CD-ROM or a DVD-ROM, or via a communication network such as the Internet.

The storage unit 3 includes a position information database (DB) 31 (position information storage means), a goods information DB 32 (goods information storage means), a related goods information DB 33 (related goods information storage means), an in-store map DB 34 (in-store map storage means), and a list storage section 35 (list storage means).

The communication unit 1 is a communication interface. The communication unit 1 performs communications such as transmission and reception of data to/from the customer terminal 400 via the network 300. The communication unit 1 has functions as a reception unit (reception means) and a transmission unit (transmission means).

The read information acquisition section 2 acquires via the communication unit 1 the specifying information (for example, the shelf ID) transmitted from the customer terminal 400.

The storage unit 3 stores the program to be executed by the control unit (not shown) of the goods information providing system 100 as well as various kinds of information.

Figure 4:
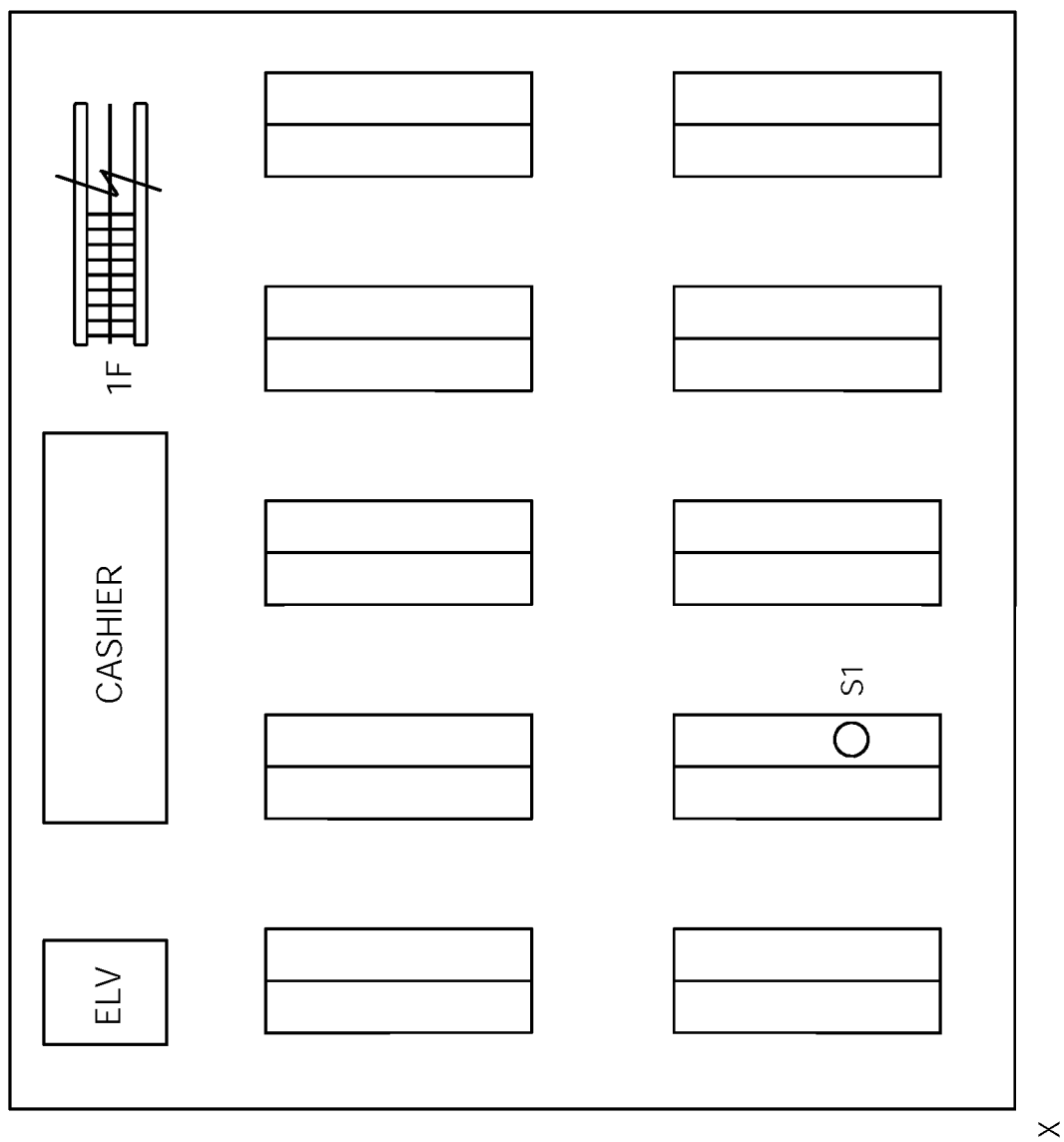
FIG. 4 is a diagram illustrating an example of an in-store map.

FIG. 3 illustrates an example of the position information DB 31. As illustrated in FIG. 3, in the position information DB 31, the shelf ID, identification information on the goods specified by the shelf ID (goods ID), and position information on the goods in the store are associated with one another. The position information is represented by, for example, an x-coordinate and a y-coordinate that are obtained when the layout of a selling space (in-store map) on each floor in the store is viewed two-dimensionally and a z-coordinate indicating a floor of the selling space (floor number). FIG. 4 illustrates an example of the in-store map on a first floor. In the position information DB 31, for example, the shelf ID "A12", the goods ID "002" of the goods specified by the shelf ID, and coordinates (X6, Y6, Z1) as the position information on the goods are associated with one another.

The first position acquisition section 4 acquires from the position information DB 31 the position information on the goods specified by the shelf ID acquired by the read information acquisition section 2. In the example of FIG. 3, the first position acquisition section 4 acquires the position information "X6, Y6, Z1" on the goods (goods ID: 002) specified by the shelf ID "A12."

Note that, the position information also indicates the position of the display shelf (shelf position) in the store. As described above, the goods position and the shelf position indicate the position of the goods that the customer currently sees (hereinafter referred to as "current goods position").

FIG. 5 illustrates an example of the goods information DB 32. As illustrated in FIG. 5, in the goods information DB 32, the goods ID, a goods name corresponding to the goods ID, a price of the goods corresponding to the goods ID, and the shelf ID of the display shelf on which the goods are displayed are associated with one another. An image of the goods, discount information, and others may also be registered in the goods information DB 32. Further, when the same goods are displayed on a plurality of shelves, a plurality of shelf IDs are associated with one goods ID. For example, when goods "shoe polish set" are displayed on two shelves in the store, the shelf IDs "A12" and "A18" are associated with the goods ID "002."

FIG. 6 illustrates an example of the related goods information DB 33. As illustrated in FIG. 6, in the related goods information DB 33, the goods ID and the identification information (goods ID) on related goods related to the goods corresponding to the goods ID are associated with one another. Note that, in FIG. 6, the goods name is illustrated along with the goods ID for the convenience of description. For example, in the related goods information DB 33, goods "shoe polish set" (goods ID: 002), "shoe spray" (goods ID: 003), "shoelace" (goods ID: 004), "detergent" (goods ID: 005), "bag" (goods ID: 006), and "belt" (goods ID: 007) are registered as the related goods of goods "shoes" (goods ID: 001). The related goods registered in the related goods information DB 33 may be set based on, for example, a purchase history of a plurality of customers. Alternatively, the goods selected by the store may be set as the related goods.

The related goods extraction section 5 extracts from the related goods information DB 33 the identification information (goods ID) on the related goods related to the goods (see FIG. 5) specified by the shelf ID acquired by the read information acquisition section 2. In the example of FIG. 6, the related goods extraction section 5 extracts the goods ID "002" (shoe polish set), the goods ID "003" (shoe spray), the goods ID "004" (shoelace), the goods ID "005" (detergent), the goods ID "006" (bag), and the goods ID "007" (belt) as the related goods of the goods "shoes" (goods ID: 001).

The second position acquisition section 6 acquires from the position information DB 31 (see FIG. 3) the position information associated with the goods ID of the related goods extracted by the related goods extraction section 5. For example, the second position acquisition section 6 acquires the position information "X6, Y6, Z1" on the goods ID "002" (shoe polish set), the position information "X6, Y8, Z1" on the goods ID "003" (shoe spray), the position information "X3, Y5, Z1" on the goods ID "004" (shoelace), the position information "X9, Y9, Z1" on the goods ID "005" (detergent), the position information "X5, Y3, Z3" on the goods ID "006" (bag), and the position information "X5, Y6, Z3" on the goods ID "007" (belt). Note that, the goods "shoe polish set" having the goods ID "002" is also displayed on another shelf (shelf ID: A18), and hence the second position acquisition section 6 further acquires "X9, Y7, Z2" as the position information on the goods ID "002" (shoe polish set).

The related goods determination processing section 7 determines, for each of related goods extracted by the related goods extraction section 5, whether or not the position of the related goods in the stores exists within a predetermined range from the current goods position. The related goods determination processing section 7 determines whether or not a linear distance from the position in the store of the goods acquired by the first position acquisition section 4 (current goods position S1) to a position E in the store of the related goods acquired by the second position acquisition section 6 falls within the predetermined range. The related goods determination processing section 7 executes the above-mentioned determination processing on all related goods extracted by the related goods extraction section 5. The related goods determination processing section 7 further outputs to the recommended goods determination section 8 a result of the determination and the goods ID of all related goods that exist within the predetermined range from the current goods position S1. Note that, when none of the related goods extracted by the related goods extraction section exists within the predetermined range, the related goods determination processing section 7 may output to the recommended goods determination section 8, for example, the goods ID of related goods closest to the current goods position.

The recommended goods determination section 8 selects the goods ID of, among the related goods extracted by the related goods extraction section 5, the related goods existing within the predetermined range from the current goods position S1, and determines the related goods as recommended goods. The recommended goods determination section 8 further lists information on the related goods determined as the recommended goods to create a related goods list. For example, the recommended goods determination section 8 acquires the goods ID of related goods from the related goods determination processing section 7 and acquires the shelf ID of the related goods and the position information on the related goods from the position information DB 31. The recommended goods determination section 8 then associates the acquired goods ID, shelf ID, and position information with one another to create the related goods list. The recommended goods determination section 8 stores the created related goods list in the list storage section 35 of the storage unit 3 and outputs the related goods list to the display data generation section 9.

The display data generation section 9 generates an image including information on the related goods (related goods information image) based on the related goods list created by the recommended goods determination section 8. The display data generation section 9 then acquires from the in-store map DB 34 the in-store map of the selling space including the display shelf corresponding to the shelf ID and adds a mark to the position of the related goods on the in-store map. The display data generation section 9 associates the in-store map to which the mark is added and the related goods information image with each other to generate display data (informing data). The display data generation section 9 transmits the generated display data to the customer terminal 400 via the communication unit 1. Note that, only at least one of the in-store map and the related goods information image needs to be included in the display data.

In the manner described above, the display data generation section 9 generates the display data, which includes the in-store map indicating the position of, among the related goods extracted by the related goods extraction section 5, the related goods selected based on the linear distance from the position of the goods acquired by the first position acquisition section 4 (current goods position S1) to the position E of the related goods acquired by the second position acquisition section 6.

When receiving the above-mentioned display data from the server 200, the customer terminal 400 stores the display data in the storage unit 24 and displays on the informing unit 23 the in-store map and the related goods information image in the display data. The customer can acquire the information on the related goods in the manner described above.

<Goods Information Providing Processing>

Figure 7:
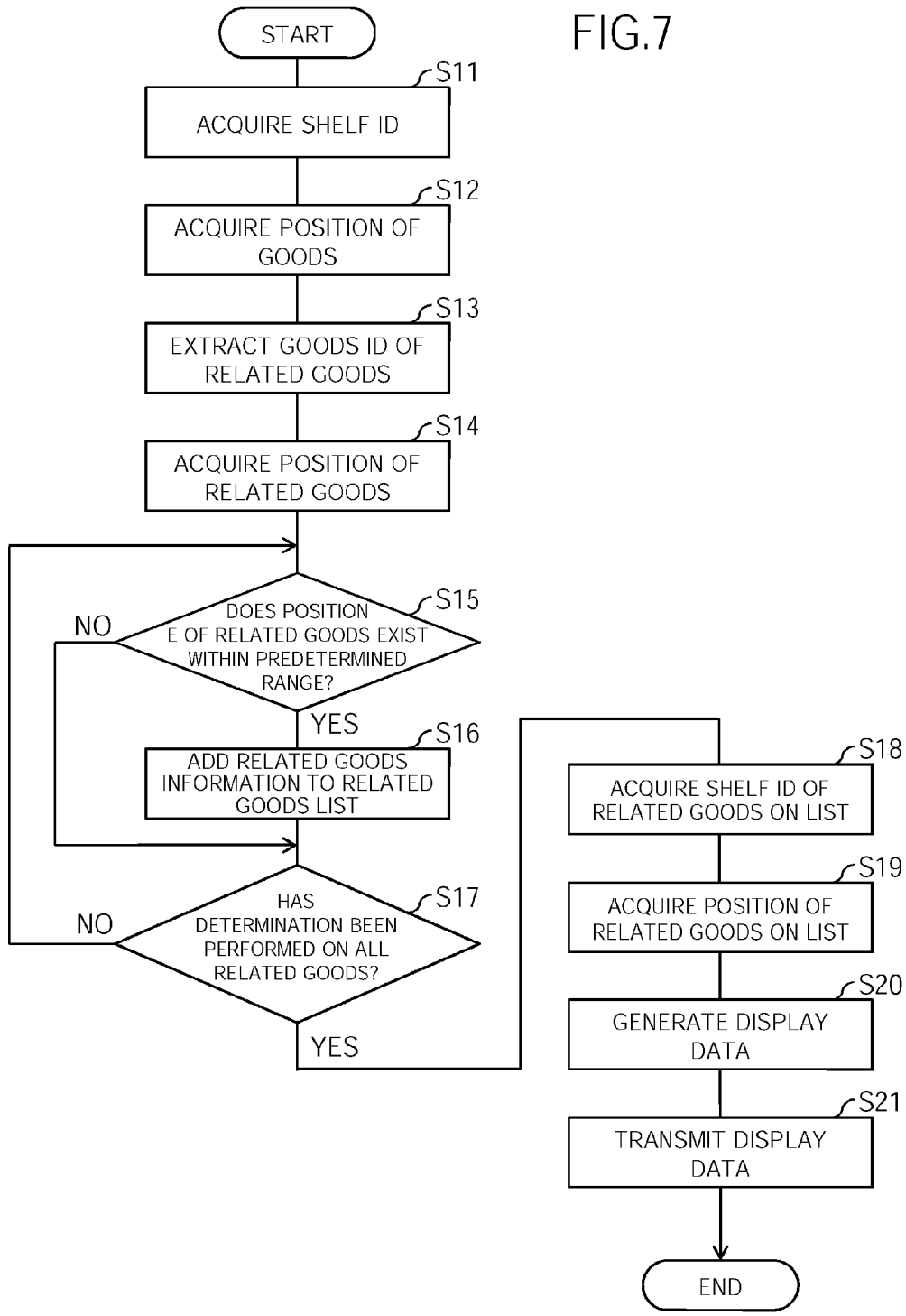
FIG. 7 is a flowchart illustrating an example of goods information providing processing executed in the goods information providing system according to the first embodiment.

Next, a description is given of goods information providing processing executed in the goods information providing system 100 referring to a flowchart. The goods information providing processing is executed by the server 200 when the server 200 receives the specifying information (for example, the shelf ID) from the customer terminal 400. FIG. 7 is a flowchart illustrating an example of the goods information providing processing executed in the goods information providing system 100. In the following, a case where the customer visits the store in order to buy the shoes is assumed as an example. It is also assumed that the customer wears the HMD as the customer terminal 400. It is further assumed that the AR marker recognizable by a camera of the HMD is attached to each shelf in each selling space of the store. Note that, for each goods, one AR marker is attached to the shelf on which the goods are displayed. In other words, the AR marker and the goods are associated with each other on a one-to-one basis. When a plurality of the same goods are displayed on different shelves, the AR markers respectively corresponding to those goods are attached to the respective shelves.

First, the customer finds his/her desired shoes in a shoes department on the first floor of the store (see FIG. 4) and stops in front of the display shelf for the shoes, and then the camera (reading unit 22) of the HMD recognizes the AR marker attached to the display shelf for the shoes to read the specifying information (shelf ID) (S31 of FIG. 16 to be described later). The HMD transmits the read specifying information to the server 200 (S32 of FIG. 16). It is assumed here that the read shelf ID is "A11."

On the server 200, first, the read information acquisition section 2 acquires the shelf ID "A11" from the HMD (customer terminal 400) (S11 of FIG. 7). Next, the first position acquisition section 4 acquires from the position information DB 31 (see FIG. 3) the coordinate position (X4, Y2, Z1) of the goods specified by the shelf ID "A11" (S12). In this manner, the position of the goods that the customer currently sees (current goods position S1) is specified. In the in-store map illustrated in FIG. 4, the position S1 of the display shelf "A11" is indicated.

Then, the related goods extraction section 5 extracts from the related goods information DB 33 (see FIG. 6) the goods ID of the related goods associated with the goods "shoes" (see FIG. 5) specified by the shelf ID "A11" (S13). In this case, the related goods extraction section 5 extracts the goods ID "002" (shoe polish set), the goods ID "003" (shoe spray), the goods ID "004" (shoelace), the goods ID "005" (detergent), the goods ID "006" (bag), and the goods ID "007" (belt).

Then, the second position acquisition section 6 acquires from the position information DB 31 (see FIG. 3) the position information associated with the goods ID of the related goods (S14). In this case, the second position acquisition section 6 acquires pieces of position information "X6, Y6, Z1" and "X9, Y7, Z2" on the goods ID "002" (shoe polish set), the position information "X6, Y8, Z1" on the goods ID "003" (shoe spray), the position information "X3, Y5, Z1" on the goods ID "004" (shoelace), the position information "X9, Y9, Z1" on the goods ID "005" (detergent), the position information "X5, Y3, Z3" on the goods ID "006" (bag), and the position information "X5, Y6, Z3" on the goods ID "007" (belt).

Then, the related goods determination processing section 7 determines, for each of related goods, whether or not the position E of the related goods exists within the predetermined range from the current goods position S1 (S15).

The predetermined range is set to a range close to the current goods position S1, for example, a range within a 20-m radius having the current goods position S1 as its center or a range corresponding to four shelves in an x direction and two shelves in a y direction in the in-store map illustrated in FIG. 4. The related goods determination processing section 7 may also compare a linear distance between the current goods position S1 and the position E of the related goods with a threshold value that is set in advance, or may compare a distance (moving route) from the current goods position S1 to the position E of the related goods with the threshold value. Further, when the floor of the selling space (selling space floor) for the current goods position S1 is different from the selling space floor for the position E of the related goods, the customer needs to move for a long distance from the current goods position S1 to the position E (the customer's moving distance is long), and hence it is preferred to determine in the above-mentioned determination processing that the position E is outside the predetermined range (NO in S15).

Figure 8:
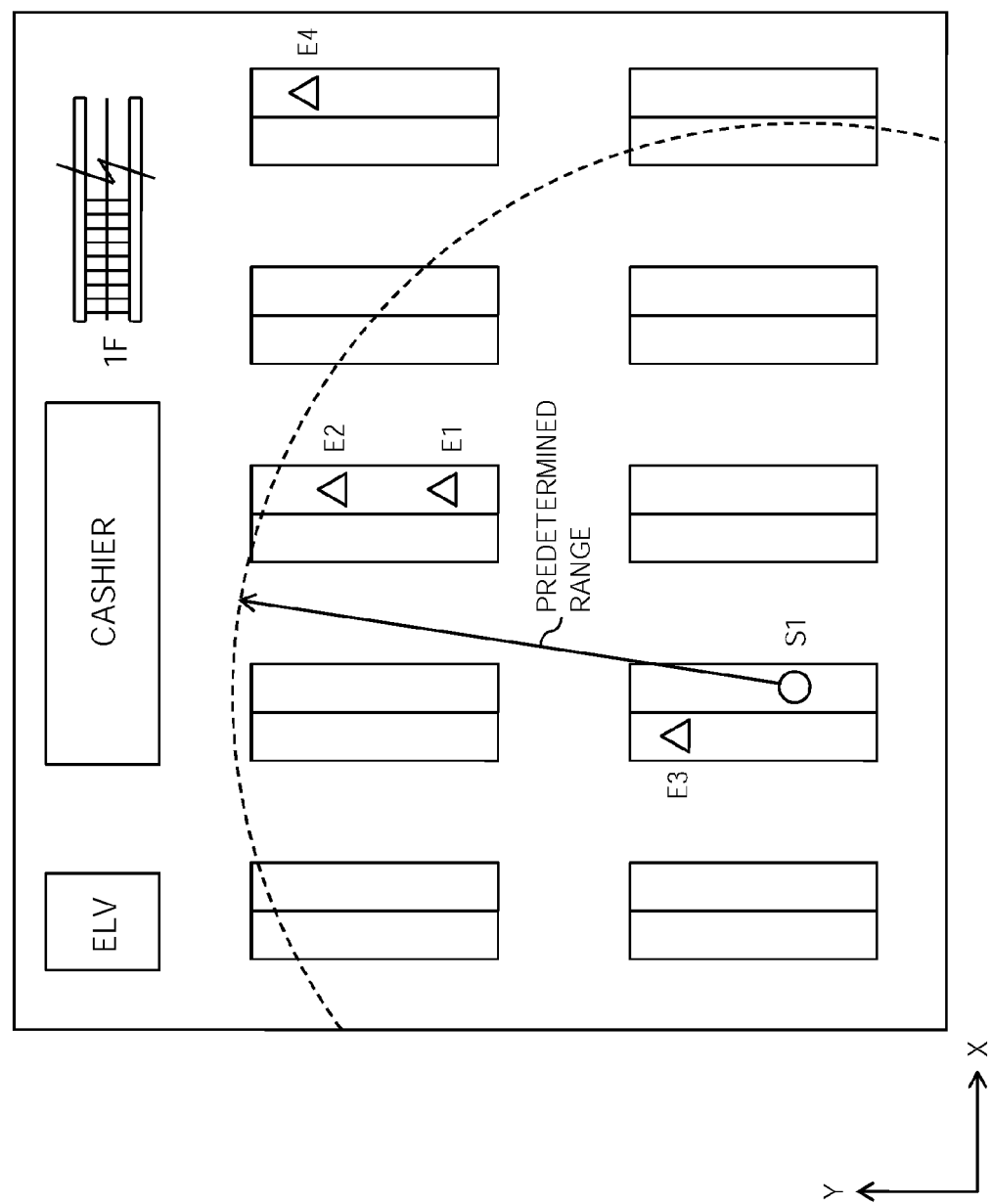
FIG. 8 is a diagram illustrating an example of the in-store map including a current goods position and a position of related goods.

FIG. 8 illustrates the position S1 of the "shoes" and positions E1, E2, E3, and E4 of the "shoe polish set", "shoe spray", "shoelace", and "detergent" as the related goods, respectively, which are displayed on the first floor of the store. In this case, for example, the positions E1, E2, and E3 of the related goods exist in the range within the 20-m radius having the current goods position S1 as its center (within the predetermined range), and hence it is determined in the determination processing of S15 that the positions E1, E2, and E3 exist within the predetermined range (YES in S15). On the other hand, the position E4 of the related goods "detergent" is outside the range within the 20-m radius having the current goods position S1 as its center, and hence it is determined in the determination processing of S15 that the position E4 is outside the predetermined range (NO in S15). Further, when the related goods "bag" and "belt" are displayed on a third floor of the store, which is different from the selling space floor for the current goods position S1 (first floor), it is determined in S15 that the positions of "bag" and "belt" are outside the predetermined range (NO in S15). Still further, when the related goods "shoe polish set" associated with the shelf ID "A18" is displayed on a second floor of the store, for example, it is similarly determined that this related goods are outside the predetermined range (NO in S15).

When the position E of the related goods exists within the predetermined range from the current goods position S1 (YES in S15), the recommended goods determination section 8 adds to the related goods list the related goods information including the goods ID of the related goods (recommended goods), the shelf ID of the related goods, and the position information (coordinates) on the related goods (S16). Note that, the related goods information may further include the image and price of the related goods.

When the position E of the related goods is outside the predetermined range from the current goods position S1 (NO in S15), the related goods are not added to the related goods list, and the processing proceeds to S17, which is the next step.

In S17, it is determined whether or not the above-mentioned determination processing has been executed on all related goods. When the determination processing has not been executed on all related goods (NO in S17), the processing returns to S15, and when the determination processing has been executed on all related goods (YES in S17), the processing proceeds to S18. FIG. 9 illustrates the related goods list created by the processing in S15 to S17 described above. In this case, pieces of related goods information relating to "shoe polish set", "shoe spray", and "shoelace" are added to the related goods list.

In S18, the display data generation section 9 acquires the shelf ID of the related goods from the related goods list. Subsequently, the display data generation section 9 acquires the position information associated with the shelf ID from the related goods list (S19).

Next, the display data generation section 9 generates the related goods information image based on the related goods list created by the recommended goods determination section 8, acquires from the in-store map DB 34 the in-store map of the selling space including the display shelf corresponding to the shelf ID "A11" (see FIG. 4), and on the in-store map, adds the mark to the position E of the related goods listed on the related goods list. The display data generation section 9 then associates the in-store map to which the current goods position S1 and the position E of the related goods are added with the related goods information image to generate the display data (S20).

In this case, three related goods are listed on the related goods list, and hence the related goods information image (see FIG. 10) and the in-store map to which the current goods position S1 and the positions E1, E2, and E3 of the related goods are added (see FIG. 11) are associated with the display data. The display data generation section 9 transmits the generated display data to the customer terminal 400 via the communication unit 1 (S21). Note that, the generated display data is stored in the storage unit 3.

<Goods Information Displaying Processing>

Next, a description is given of goods information displaying processing executed in the goods information providing system 100. The goods information displaying processing is executed by the customer terminal 400 when the customer terminal 400 receives the display data from the server 200.

Figure 16:
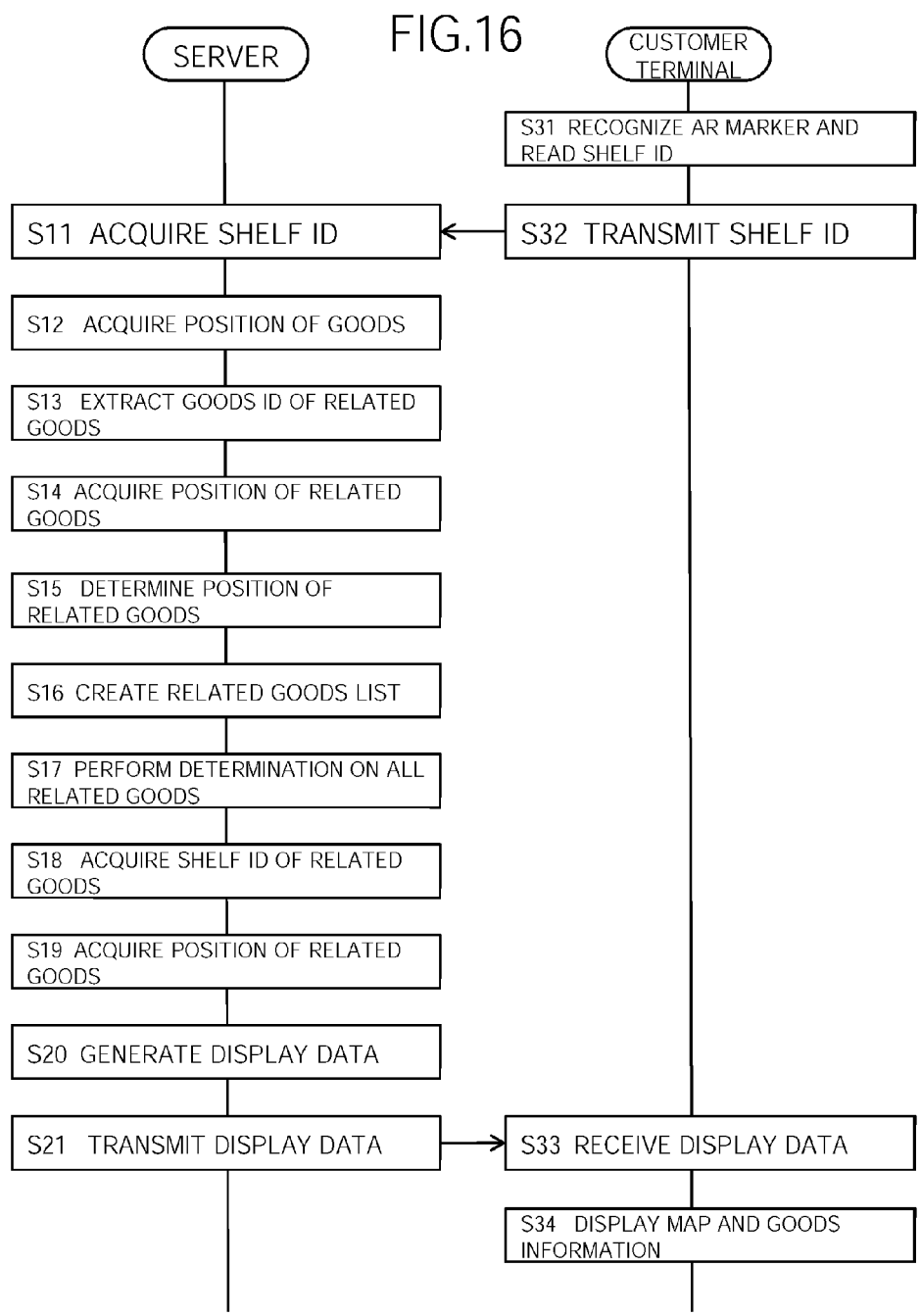
FIG. 16 is a flowchart illustrating a series of processing executed in the goods information providing system according to the first embodiment.

When receiving the display data from the server 200 (S33 of FIG. 16 to be described later), the HMD (customer terminal 400) stores the received display data in the storage unit 24, and displays on the informing unit 23 display information corresponding to the display data (related goods information image and in-store map) (S34 of FIG. 16).

Figure 10:
FIG. 10 is a diagram illustrating an example of a related goods information image.

FIG. 10 illustrates an example of the related goods information image displayed on the informing unit 23. In this case, pieces of information relating to the related goods "shoe polish set", "shoe spray", and "shoelace" are displayed on the informing unit 23. For example, the informing unit 23 displays the image of the goods, the name of the goods, the selling space for the goods, and the name of the display shelf (shelf ID) on which the goods are displayed. The informing unit 23 further displays marks E1, E2, and E3 corresponding to the respective related goods as the related goods information so that the displayed marks correspond to the positions E1, E2, and E3 of the related goods on the in-store map. Note that, the related goods information image may also include the price of the goods, an inventory status of the goods, and information relating to the goods.

Figure 11:
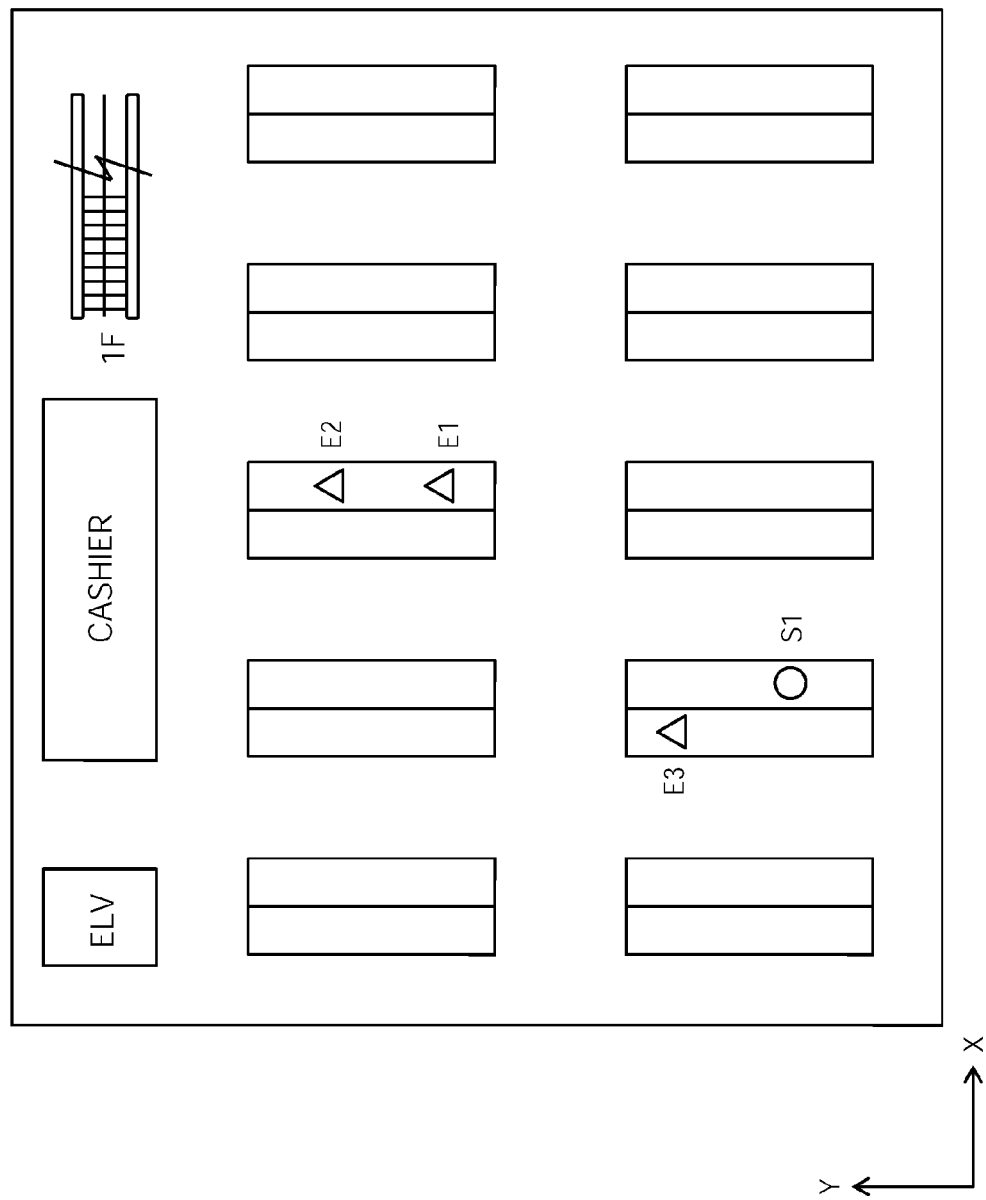
FIG. 11 is a diagram illustrating an example of the in-store map.

FIG. 11 illustrates an example of the in-store map indicating the position of the related goods, which is displayed on the informing unit 23. The customer can recognize the position at which the related goods are displayed through this in-store map. Note that, the related goods information image illustrated in FIG. 10 and the in-store map illustrated in FIG. 11 may be displayed on the informing unit 23 in parallel with each other, or the customer may switch the related goods information image and the in-store map for display.

Figure 12:
FIG. 12 is a diagram illustrating an example of the related goods information image.
Figure 13:
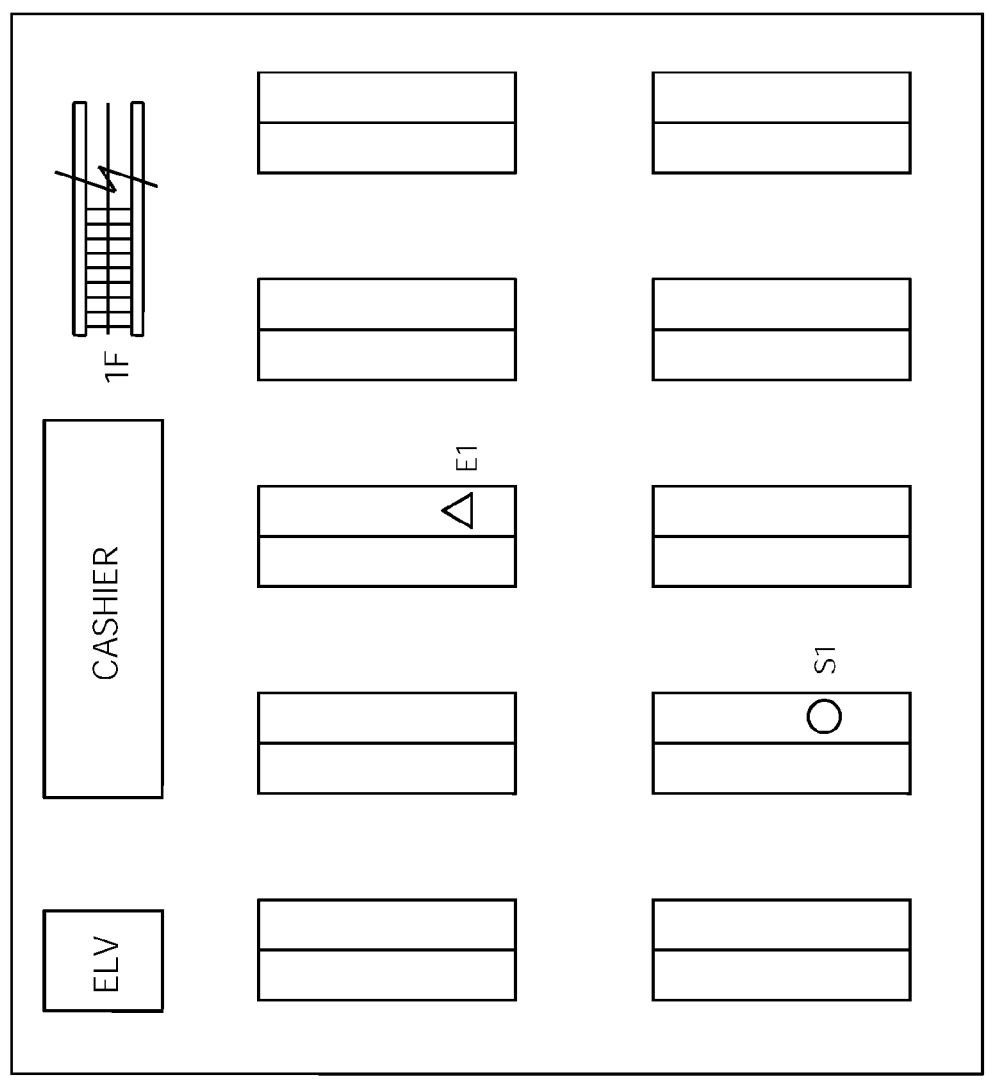
FIG. 13 is a diagram illustrating a map 1 displayed on an informing unit.
Figure 14:
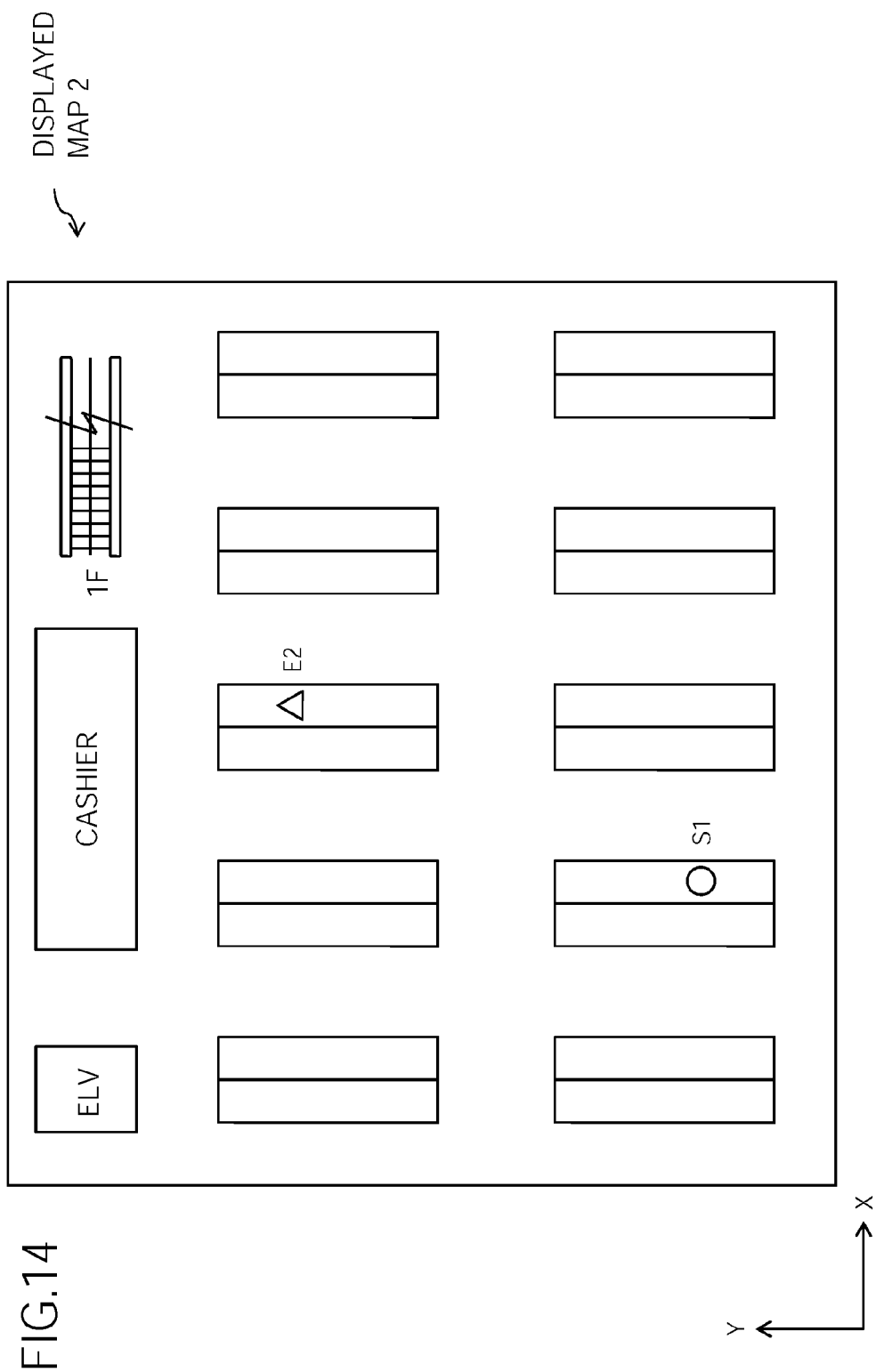
FIG. 14 is a diagram illustrating a map 2 displayed on the informing unit.
Figure 15:
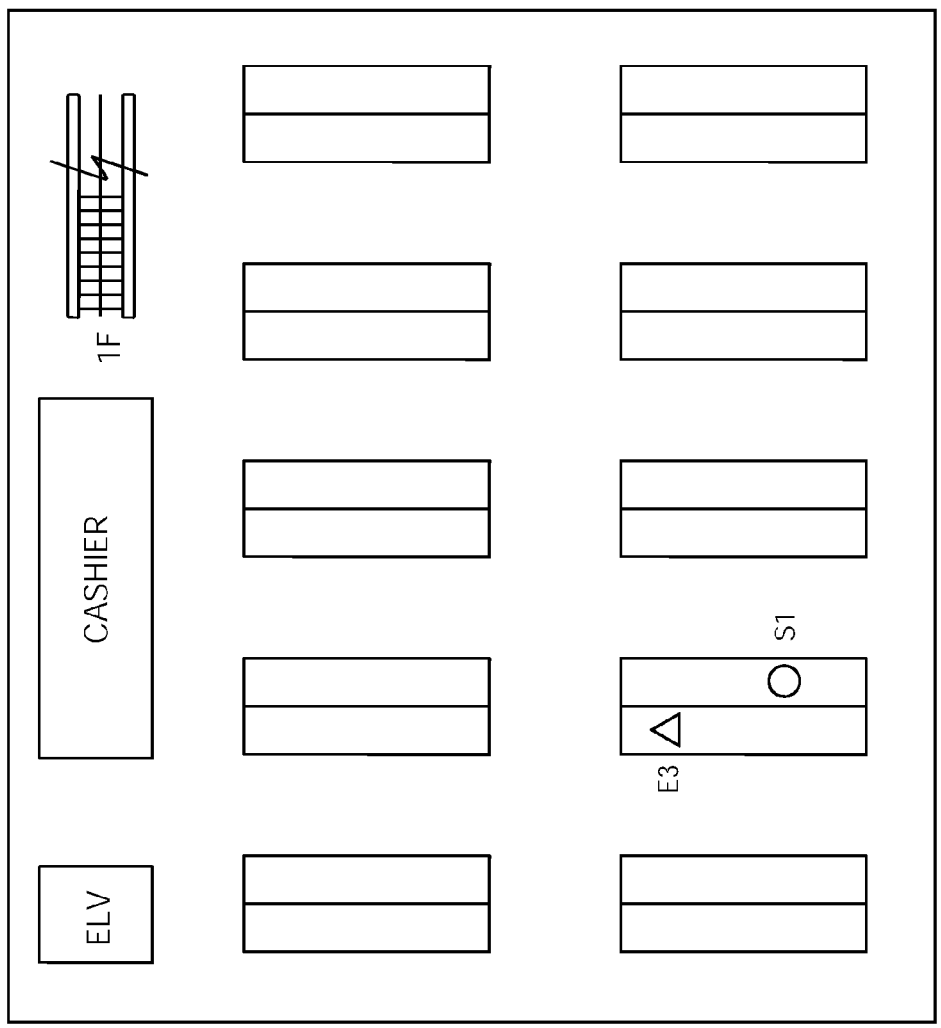
FIG. 15 is a diagram illustrating a map 3 displayed on the informing unit.

In the above-mentioned example, the positions of all the related goods are displayed on one in-store map as illustrated in FIG. 11, but as another example, the informing unit 23 may be configured to display only the position of, among all the related goods, related goods that are selected by the customer on the in-store map. In this configuration, as illustrated in FIG. 12, a "DISPLAY MAP 1" button, a "DISPLAY MAP 2" button, and a "DISPLAY MAP 3" button are placed on the related goods information image of the informing unit 23, and the in-store map is switched to the one corresponding to a button selected by the customer and is displayed. For example, when the customer selects the "DISPLAY MAP 1" button of FIG. 12, a map 1 indicating the position E1 of "shoe polish set" is displayed on the informing unit 23 as illustrated in FIG. 13. Further, when the customer selects the "DISPLAY MAP 2" button of FIG. 12, a map 2 indicating the position E2 of "shoe spray" is displayed on the informing unit 23 as illustrated in FIG. 14. Still further, when the customer selects the "DISPLAY MAP 3" button of FIG. 12, a map 3 indicating the position E3 of "shoelace" is displayed on the informing unit 23 as illustrated in FIG. 15.

Note that, in the in-store map displayed on the informing unit 23 of the customer terminal 400, a mark S indicating the current goods position may be displayed, or may not be displayed. In other words, at least the position of at least one piece of related goods displayed near the current goods position is displayed on the informing unit 23 of the customer terminal 400. Note that, when the display data generated by the server 200 does not include the in-store map, only the related goods information image is displayed on the informing unit 23 of the customer terminal 400.

FIG. 16 illustrates a series of processing executed in the goods information providing system 100 including the goods information providing processing and the goods information displaying processing that are described above. Respective steps "S" illustrated in FIG. 16 correspond to the respective steps "S" of the goods information providing processing and the goods information displaying processing that are described above. As illustrated in FIG. 16, when the AR marker enters a field of view of the customer and a predetermined time period elapses, in other words, when the camera of the HMD recognizes the AR marker, the processing in the goods information providing system 100 (goods information providing processing and goods information displaying processing) is executed.

According to the goods information providing system 100 described above, it is possible to provide information on the goods related to the goods displayed in front of the customer (related goods). It is therefore possible to reduce a loss of the customer's opportunity to buy. Such a loss of the customer's opportunity to buy may be, for example, a case where the customer forgets to buy the related goods and leaves the store although the customer desired to buy the related goods. Further, there is a possibility that the related goods are goods that the customer does not desire to buy at present but the customer may as well or should buy, and hence it is also possible to reduce a loss of the customer's opportunity to buy such goods when the customer visits the store. Further, for example, information on the related goods (recommended goods) displayed near the desired goods by the customer can be provided to the customer, and hence it is possible to reduce the customer's time and effort to move to the display shelf. It is therefore possible to enhance the convenience of the customer's shopping in the real store. Further, the information on the goods related to the desired goods by the customer can be provided to the customer, and hence it is possible to stimulate the customer's desire to buy in the real store. It is also possible to promote the customer to browse in the real store.

Modified Example 1

A goods information providing system 100a according to Modified Example 1 of the first embodiment (see FIG. 1) is configured to determine a plurality of related goods that are displayed in proximity to one another as the recommended goods from among the related goods existing within the predetermined range from the current goods position, and provide the customer with information on the determined related goods.

For example, the goods information providing system 100a provides the customer with information on the related goods "shoe polish set" (position E1) and "shoe spray" (position E2) that are disposed (displayed) in proximity to one another (in a region in which the related goods are distributed with the highest density), from among the related goods "shoe polish set" (position E1), "shoe spray" (position E2), and "shoelace" (position E3) existing within the predetermined range from the current goods position S1 in the in-store map illustrated in FIG. 8.

Figure 17:
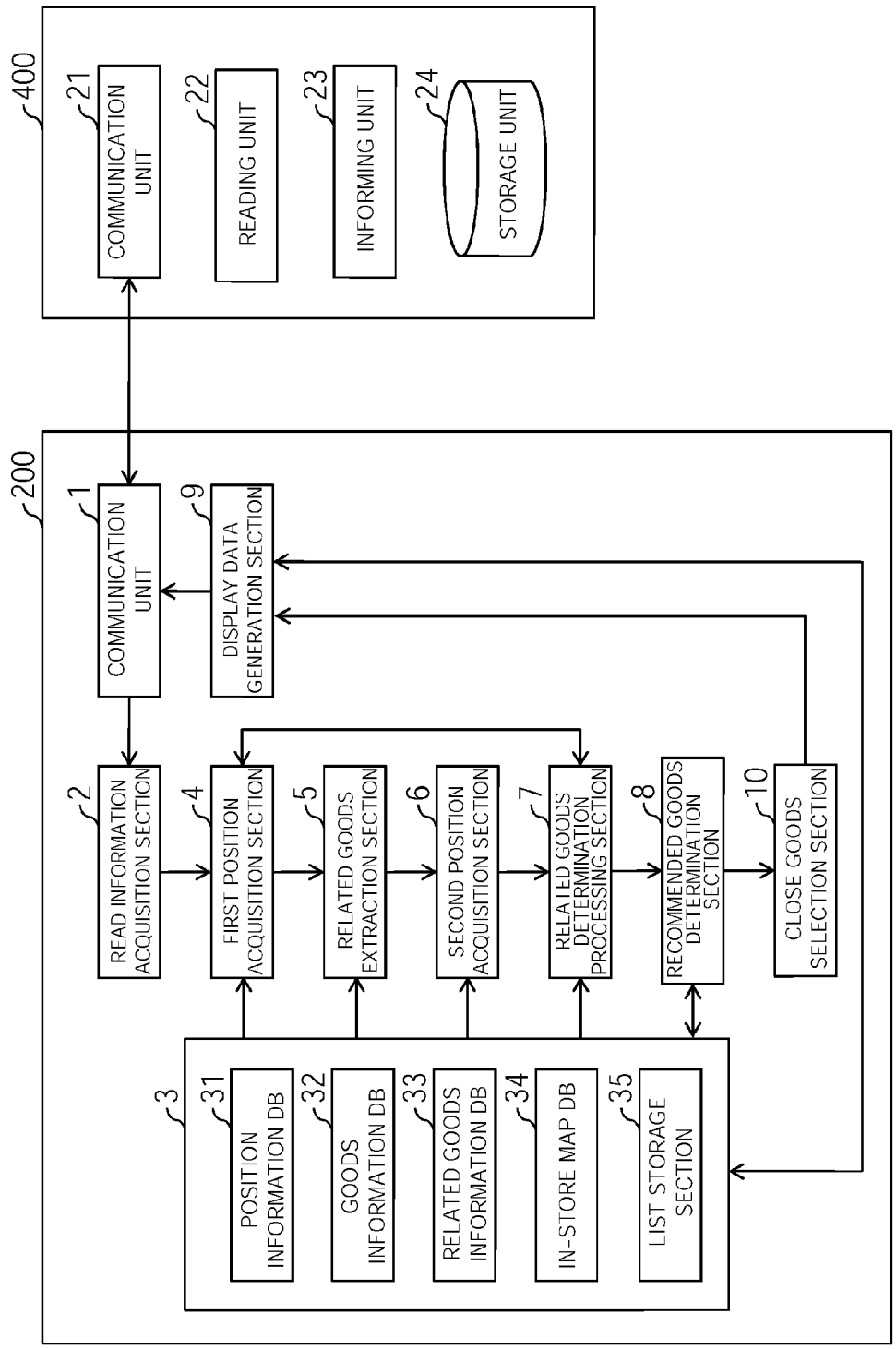
FIG. 17 is a block diagram illustrating a specific configuration of a goods information providing system according to Modified Example 1 of the first embodiment.
Figure 18:
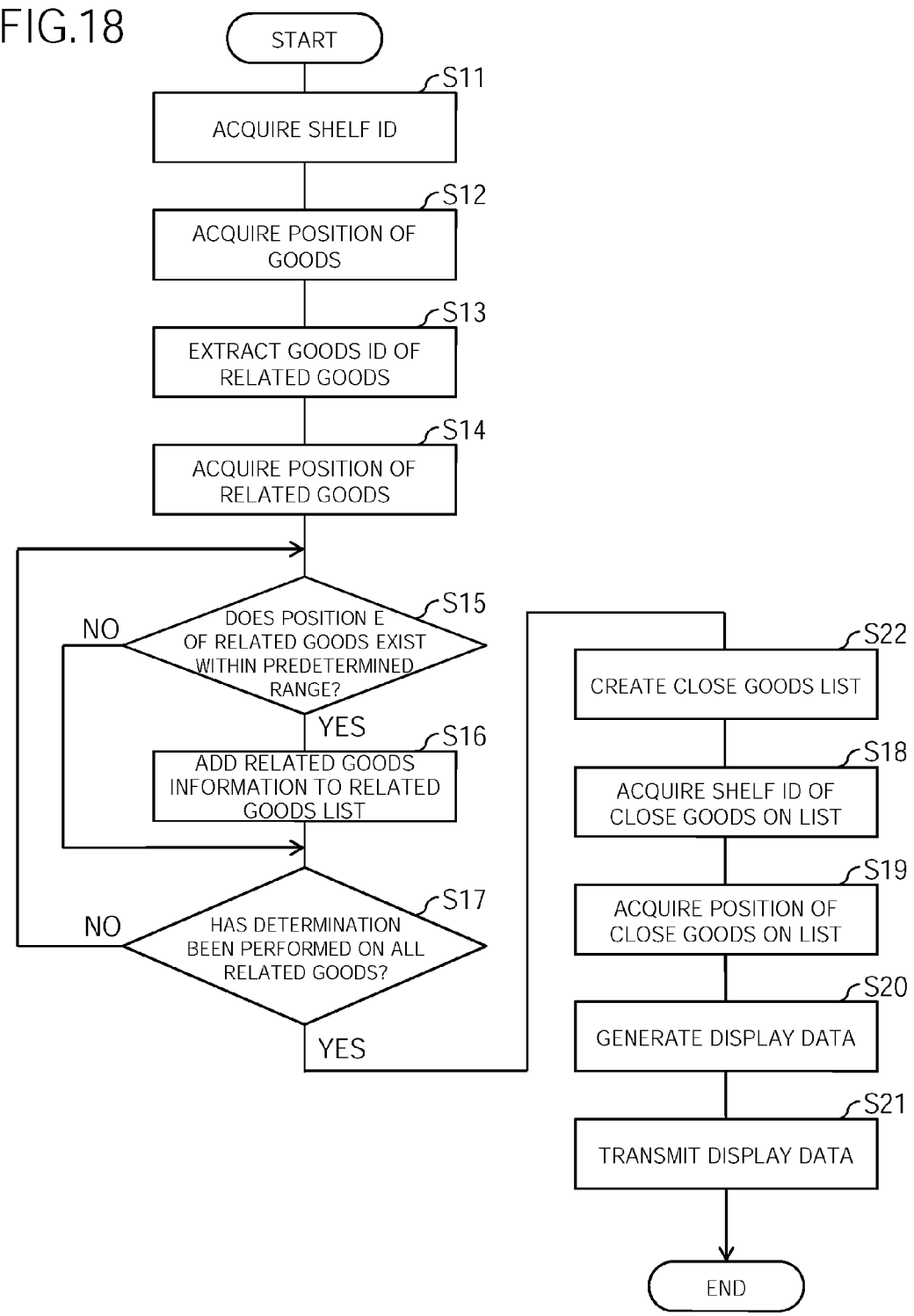
FIG. 18 is a flowchart illustrating an example of goods information providing processing executed in the goods information providing system according to Modified Example 1 of the first embodiment.

In order to implement the above-mentioned configuration, the server 200 of the goods information providing system 100a further includes a close goods selection section 10 (recommended goods determination means) in addition to the configuration of the goods information providing system 100 (see FIG. 2). FIG. 17 is a block diagram illustrating a specific configuration of the goods information providing system 100a. FIG. 18 is a flowchart illustrating an example of goods information providing processing executed in the goods information providing system 100a. In the following, a difference from the above-mentioned goods information providing system 100 is mainly described.

The close goods selection section 10 selects a plurality of related goods (recommended goods) that are displayed in proximity to one another from among the related goods listed on the related goods list created by the recommended goods determination section 8 (see, for example, FIG. 9) and creates a close goods list (S22 of FIG. 18). For example, the close goods selection section 10 extracts, for each of related goods listed on the related goods list (see FIG. 9), another related goods displayed (disposed) within a predetermined range (close range) having the position E of the related goods as its center, and selects the related goods that have been extracted a large number of times after the extraction processing is executed on all related goods listed on the related goods list as a close goods to create the close goods list. Note that, the close goods selection section 10 may set the position E of the related goods that have been extracted the largest number of times as the center and select the related goods included in the close range as the close goods, or may select all related goods that have been extracted a plurality of times as the close goods.

Note that, the close range is set to a range close to the position E of the related goods, for example, a range within a 5-m radius having the position E set as its center or a range corresponding to three shelves in the x direction and one shelf in the y direction in the in-store map illustrated in FIG. 4.

Figure 19:
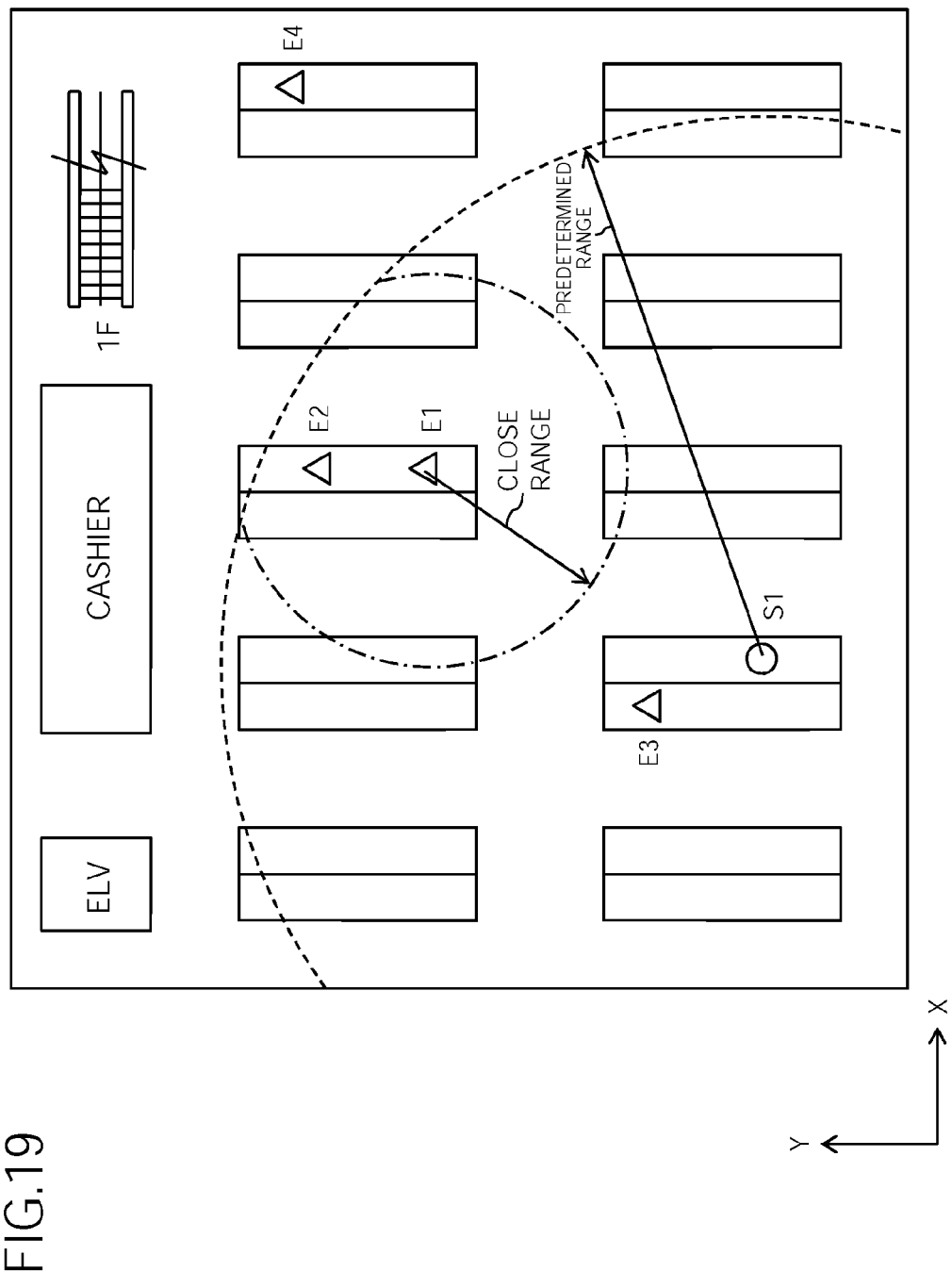
FIG. 19 is a diagram illustrating an example of the in-store map including a close range in the goods information providing system according to Modified Example 1 of the first embodiment.
Figure 20:
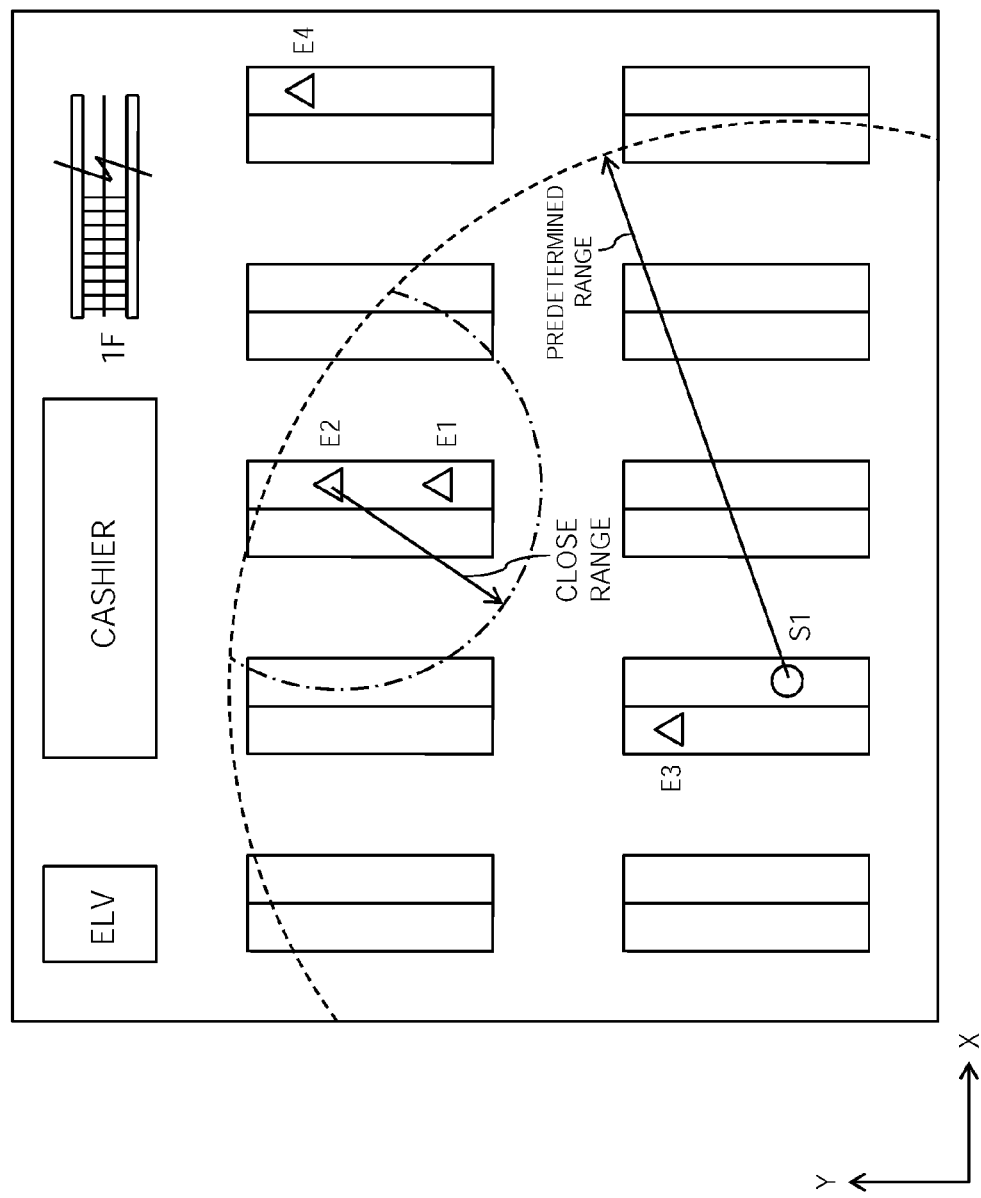
FIG. 20 is a diagram illustrating an example of the in-store map including a close range in the goods information providing system according to Modified Example 1 of the first embodiment.
Figure 21:
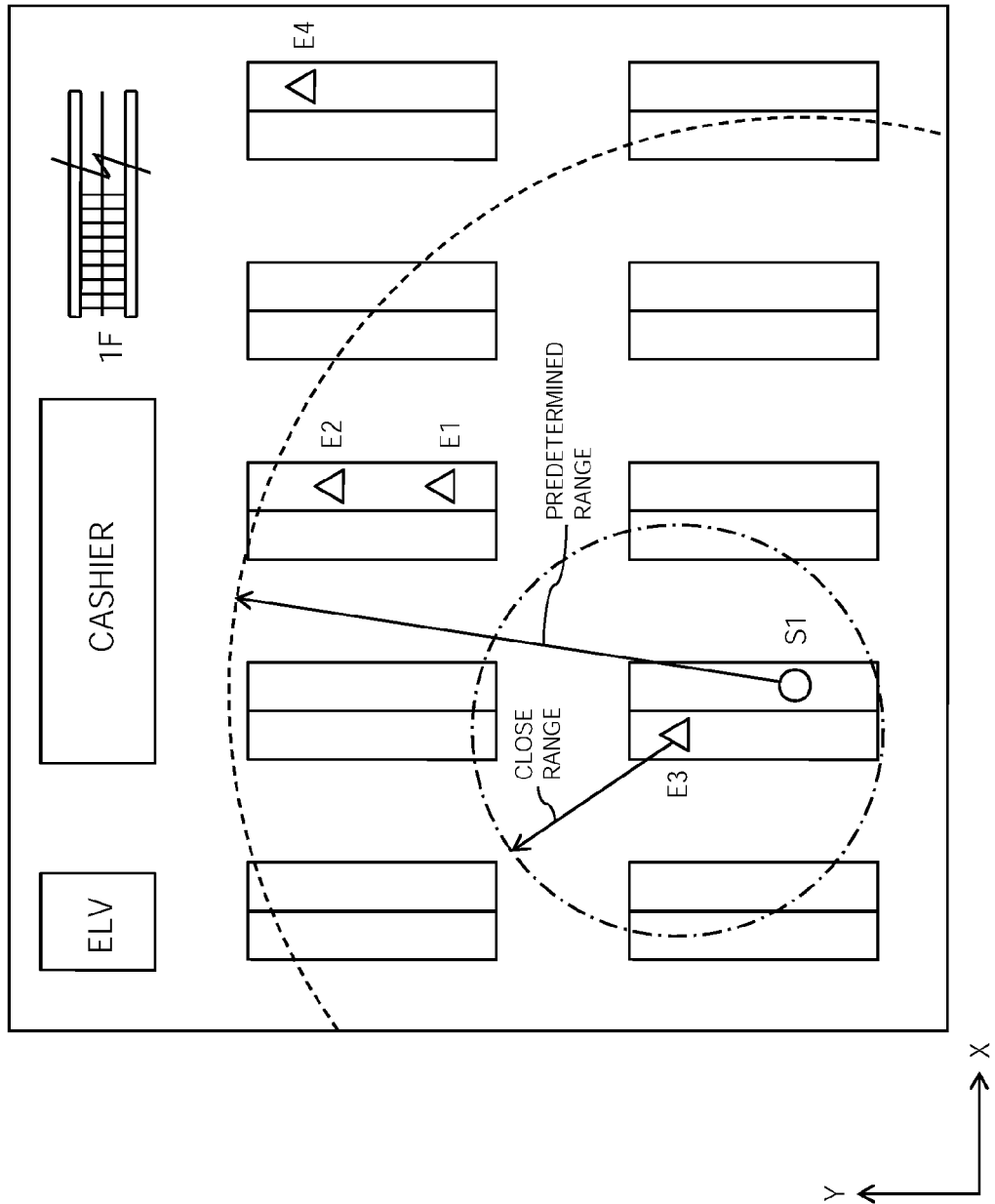
FIG. 21 is a diagram illustrating an example of the in-store map including a close range in the goods information providing system according to Modified Example 1 of the first embodiment.

Taking a specific example, a description is given below. FIG. 19 illustrates the close range to the related goods "shoe polish set" existing within the above-mentioned predetermined range having the position E1 set as its center. FIG. 20 illustrates the close range to the related goods "shoe spray" existing within the predetermined range having the position E2 as its center. FIG. 21 illustrates the close range to the related goods "shoelace" existing within the predetermined range having the position E3 as its center.

As illustrated in FIG. 19, the close range having the position E1 as its center includes the position E2. As illustrated in FIG. 20, the close range having the position E2 as its center includes the position E1. As illustrated in FIG. 21, the close range having the position E3 as its center does not include any of the positions E1 and E2. In the above-mentioned example, the close goods selection section 10 selects the related goods "shoe polish set" and "shoe spray" disposed at the positions E1 and E2 that have been extracted a large number of times as the close goods to create the close goods list. Specific examples of the close goods list include a goods list obtained by deleting the related goods "shoelace" from the related goods list of FIG. 9.

The close goods list created by the close goods selection section 10 is output to the display data generation section 9. The display data generation section 9 acquires the shelf ID of the close goods from the close goods list (S18 of FIG. 18), and subsequently acquires the position E of the close goods (S19). The display data generation section 9 then associates map data to which the current goods position S1 and the position E of the close goods are added and the related goods information image of the close goods with each other to generate the display data (S20), and transmits the generated display data to the customer terminal 400 (S21).

As described above, the display data generation section 9 in the goods information providing system 100a according to Modified Example 1 generates the following display data. Specifically, the display data includes the in-store map indicating the position of the related goods selected from among the related goods, which are selected based on the linear distance from the position of the goods (current goods position S1) acquired by the first position acquisition section 4 to the position E of the related goods acquired by the second position acquisition section 6, based on relative positions of those related goods in the store.

According to the goods information providing system 100a of Modified Example 1, which can guide the customer to an area in which the related goods are disposed in proximity to one another, it is possible to further reduce a loss of the customer's opportunity to buy.

Modified Example 2

A goods information providing system 100b according to Modified Example 2 of the first embodiment (see FIG. 1) is configured to provide the customer with information on the related goods (recommended goods) that are determined from among the related goods existing within the predetermined range from the current goods position based on the discount information on the desired goods by the customer. The discount information is, for example, a discount amount, a price after discount, or a discount rate, and the discount information is stored in the goods information DB 32 (see FIG. 5) in association with the identification information (goods ID) on the goods.

For example, when the discount amount for the desired goods by the customer "shoes" is 500 yen, information on the related goods "shoelace" whose price is lower than the discount amount (500 yen) is provided to the customer, from among the related goods "shoe polish set" (position E1), "shoe spray" (position E2), and "shoelace" (position E3) existing within the predetermined range from the current goods position S1 in the in-store map illustrated in FIG. 8.

Figure 22:
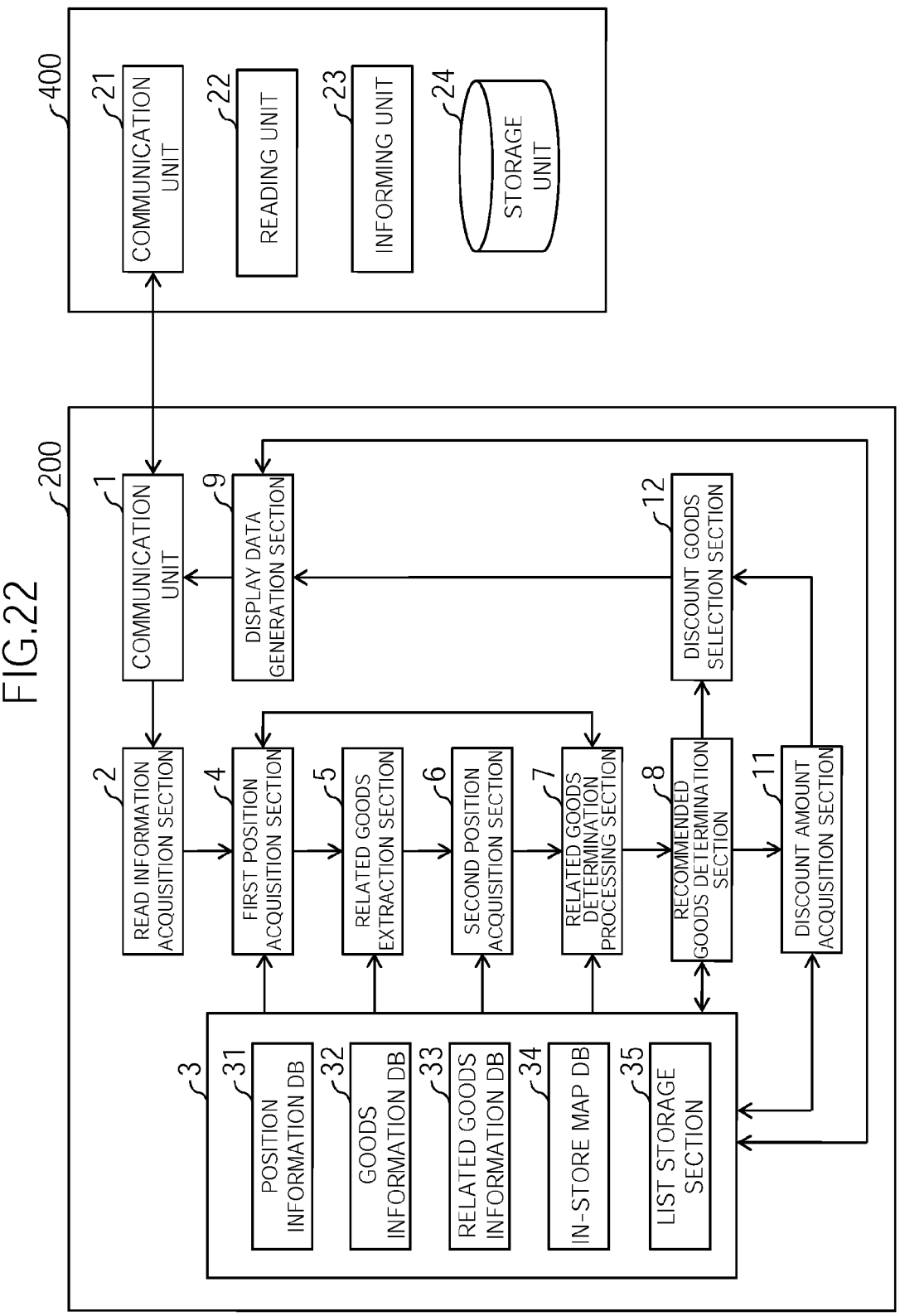
FIG. 22 is a block diagram illustrating a specific configuration of a goods information providing system according to Modified Example 2 of the first embodiment.
Figure 23:
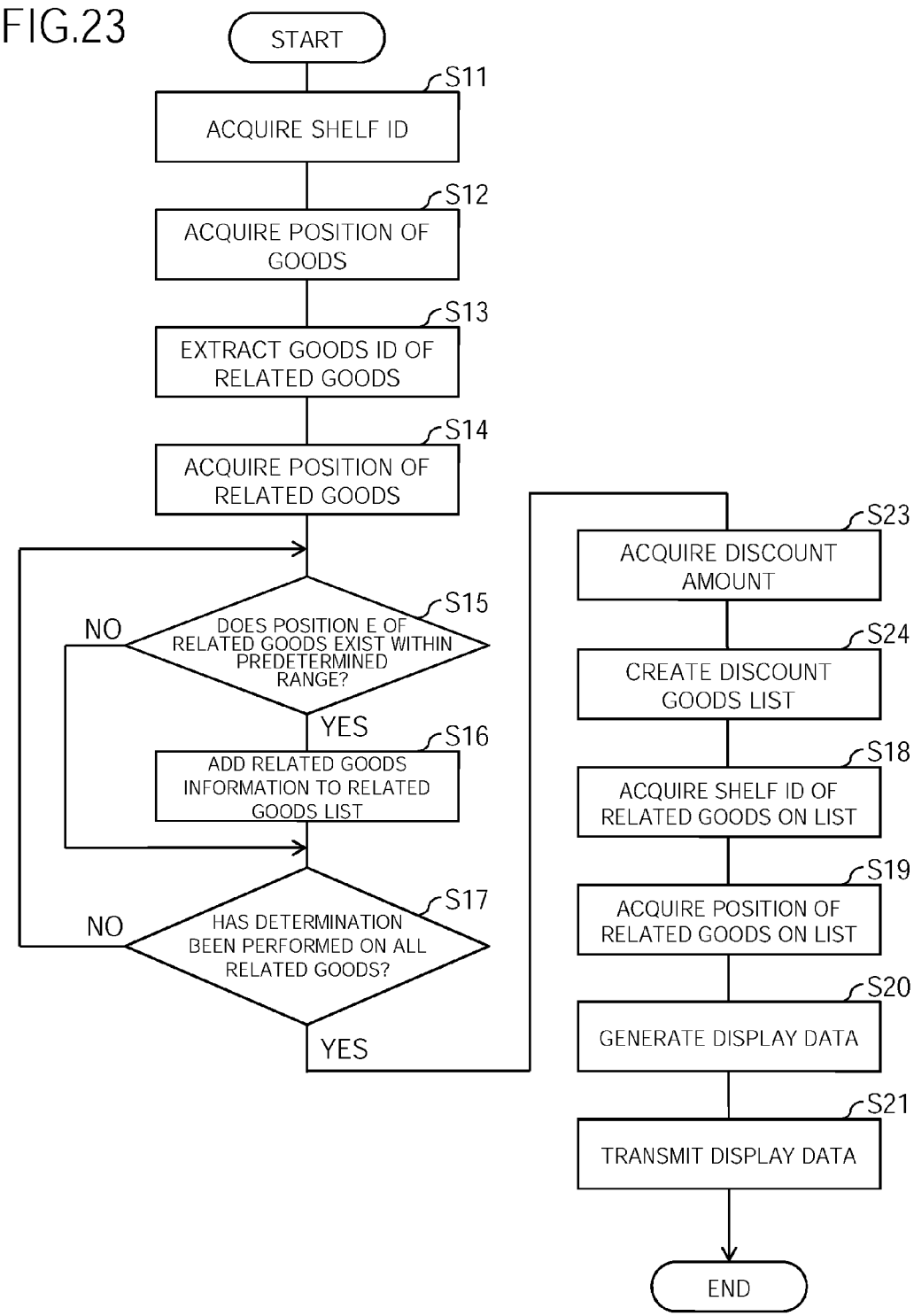
FIG. 23 is a flowchart illustrating an example of goods information providing processing executed in the goods information providing system according to Modified Example 2 of the first embodiment.

In order to implement the above-mentioned configuration, the server 200 of the goods information providing system 100b further includes a discount amount acquisition section 11 and a discount goods selection section 12 (recommended goods determination means) in addition to the configuration of the goods information providing system 100 (see FIG. 2). FIG. 22 is a block diagram illustrating a specific configuration of the goods information providing system 100b. FIG. 23 is a flowchart illustrating an example of goods information providing processing executed in the goods information providing system 100b. In the following, a difference from the above-mentioned goods information providing system 100 is mainly described.

When the recommended goods determination section 8 creates the related goods list, the discount amount acquisition section 11 acquires from the goods information DB 32 the discount amount for the goods associated with the shelf ID acquired by the read information acquisition section 2 (S23 of FIG. 23). For example, the discount amount acquisition section 11 acquires from the goods information DB 32 the discount amount of 500 yen for the goods "shoes" (goods ID: 001) associated with the shelf ID "A11."

The discount goods selection section 12 selects the goods ID of the related goods listed on the above-mentioned related goods list and whose price is lower than the above-mentioned discount amount (500 yen), determines the related goods as the recommended goods, and creates a discount goods list (S24). In this case, the discount goods selection section 12 selects the goods ID "004" of the related goods "shoelace" (price: 300 yen) whose price is lower than the discount amount (500 yen), and creates the discount goods list.

The discount goods list created by the discount goods selection section 12 is output to the display data generation section 9. The display data generation section 9 acquires the shelf ID of the related goods listed on the discount goods list (S18 of FIG. 23), and subsequently acquires the position E of the related goods (S19). The display data generation section 9 then associates the in-store map to which the current goods position S1 and the position E of the related goods are added and the related goods information image relating to the related goods with each other to generate the display data (S20), and transmits the generated display data to the customer terminal 400 (S21).

Note that, when there is no related goods listed on the related goods list and whose price is lower than the discount amount, the discount goods selection section 12 may select the goods ID of the related goods whose price is closest to the discount amount.

As described above, the display data generation section 9 in the goods information providing system 100b according to Modified Example 2 generates the following display data. Specifically, the display data includes the in-store map indicating the position of the related goods whose price satisfies a condition based on the discount amount of the goods specified by the shelf ID (specifying information), from among the related goods that are selected based on the linear distance from the position of the goods (current goods position S1) acquired by the first position acquisition section 4 to the position E of the related goods acquired by the second position acquisition section 6, based on relative positions of those related goods in the store.

According to the goods information providing system 100b of Modified Example 2, which can provide the customer with, for example, the information on the related goods that can be bought additionally with the use of the discount amount for the desired goods by the customer, it is possible to further reduce a loss of the customer's opportunity to buy.

Second Embodiment

Referring to the accompanying drawings, a description is now given of a second embodiment of the present invention. Note that, for convenience of the description, a component having the same function as that of the component described above in the first embodiment is denoted by the same reference numeral (and symbol) and the description thereof is omitted. Further, the terms defined in the first embodiment are used in accordance with their definitions also in this embodiment unless otherwise specified. Note that, the same also applies to a third embodiment of the present invention to be described later.

Figure 24:
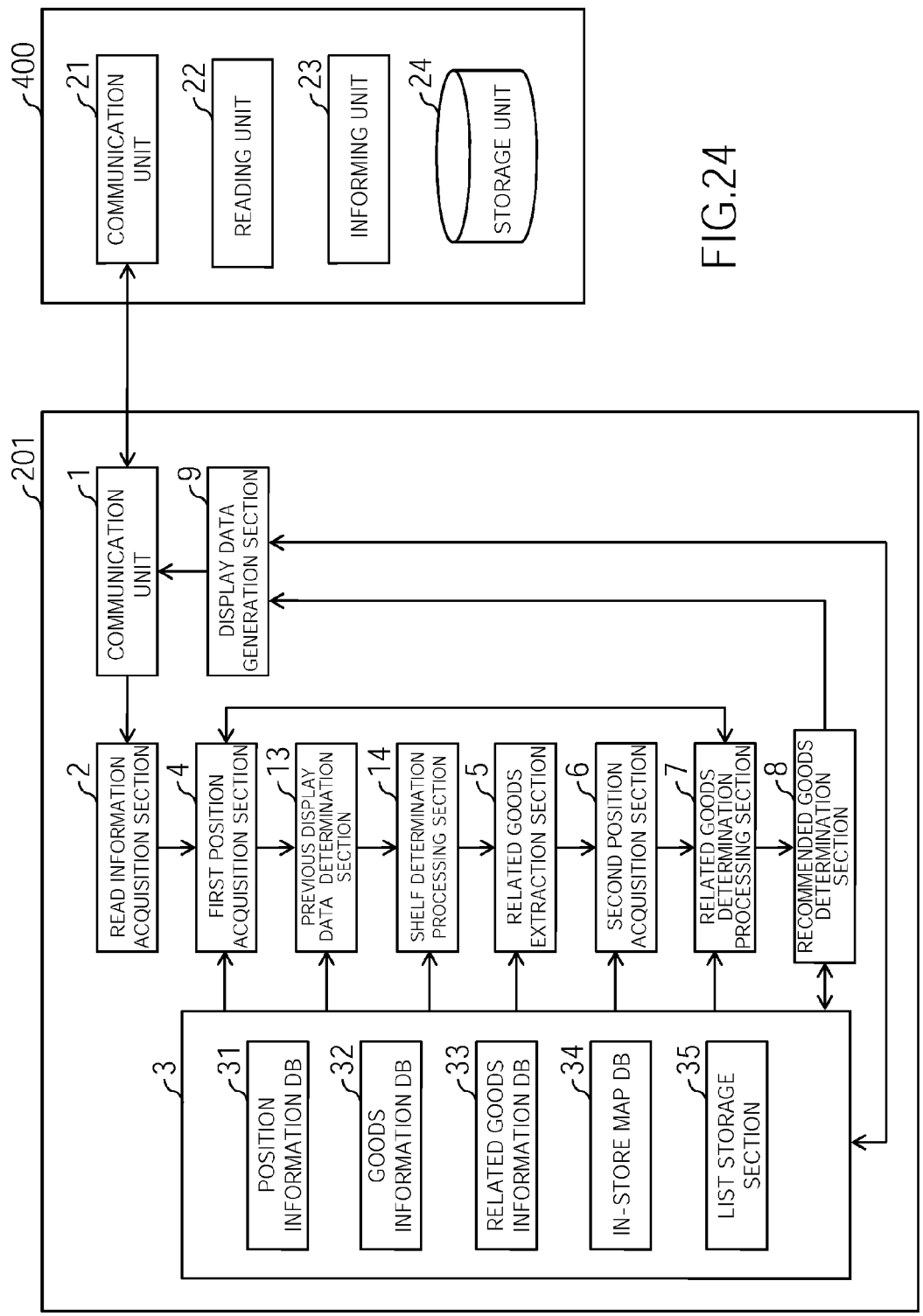
FIG. 24 is a block diagram illustrating a specific configuration of a goods information providing system according to the second embodiment of the present invention.

FIG. 24 is a diagram illustrating an example of a specific configuration of a goods information providing system 500 (see FIG. 1) according to the second embodiment. In the goods information providing system 500, a server 201 further includes a previous display data determination section 13 and a shelf determination processing section 14 in addition to the configuration of the server 200 described above in the first embodiment.

When acquiring the shelf ID from the customer terminal 400, the previous display data determination section 13 determines whether or not display data 1 (first display data) generated in the goods information providing processing executed last time is stored in the storage unit 3.

The shelf determination processing section 14 compares the shelf ID acquired from the customer terminal 400 with the shelf ID of the related goods associated with the display data 1 generated last time, and performs processing based on a result of the comparison. Specific details of the processing are described later.

<Goods Information Providing Processing>

Figure 25:
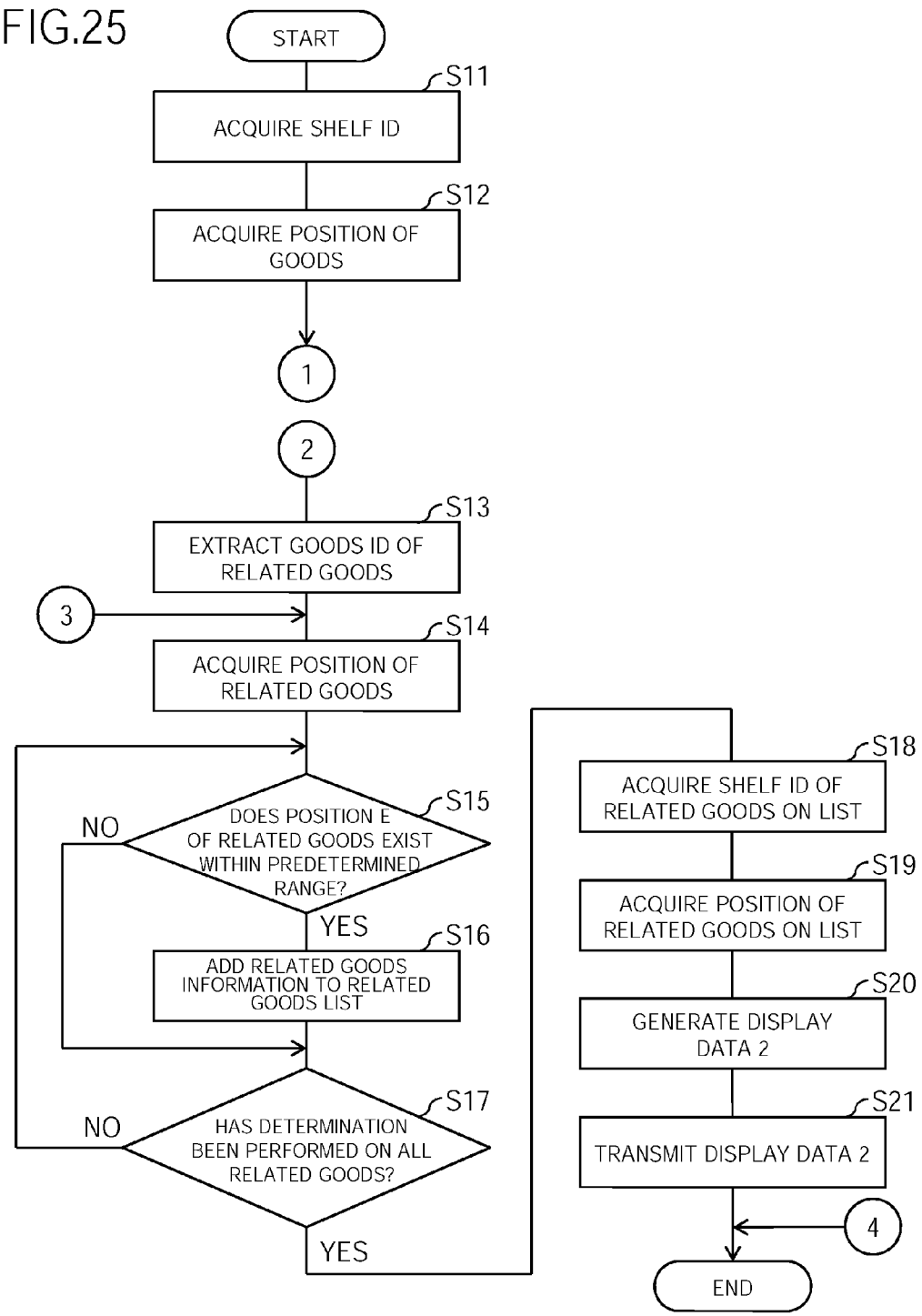
FIG. 25 is a flowchart illustrating an example of goods information providing processing executed in the goods information providing system according to the second embodiment.
Figure 26:
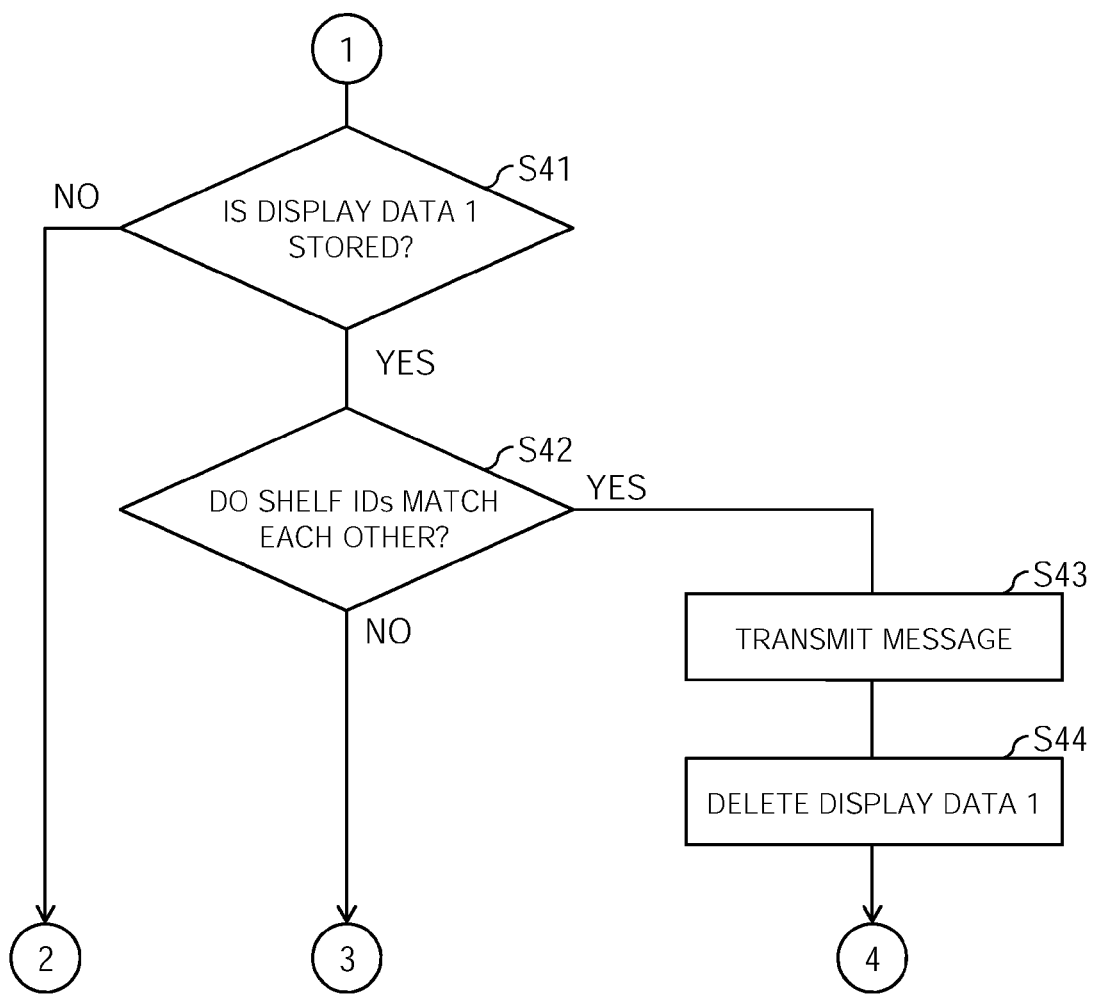
FIG. 26 is a flowchart illustrating the example of the goods information providing processing executed in the goods information providing system according to the second embodiment.

Next, a description is given of goods information providing processing executed in the goods information providing system 500. FIGS. 25 and 26 are flowcharts illustrating an example of goods information providing processing executed in the goods information providing system 500.

The following case is assumed here. Specifically, first, the customer finds his/her desired shoes in the shoes department on the first floor of the store, and the shelf ID "A11" of the shoes is transmitted to the server 201. As a result, the same processing as the goods information providing processing according to the first embodiment described above (see FIG. 7) is executed on the server 201. Then, the related goods information images of the related goods "shoe polish set", "shoe spray", and "shoelace" (see FIG. 10) and the in-store map to which the current goods position S1 and the positions E1, E2, and E3 are added (see FIG. 11) are associated with each other to generate the display data 1, and the generated display data 1 is transmitted to the customer terminal 400. In other words, the following description is given of processing executed in the goods information providing system 500 after the pieces of information on the related goods ("shoe polish set", "shoe spray", and "shoelace") (recommended goods) for the goods "shoes" (related goods information images) are displayed on the informing unit 23 of the customer terminal 400 (HMD).

First, after confirming the related goods information image and the in-store map of the display data 1 displayed on the informing unit 23 of the HMD, the customer moves to the position of another piece of goods different from the related goods (recommended goods) associated with the display data 1 (for example, on the second floor of the store), and stops in front of the another piece of goods (for example, "personal computer (PC)"). The camera of the HMD (reading unit 22) then recognizes the AR marker attached to the display shelf for the another piece of goods to read the specifying information (shelf ID: F21) (S35 of FIG. 28 to be described later). The HMD transmits the read shelf ID "F21" to the server 201 (S36 of FIG. 28).

On the server 201, the read information acquisition section 2 acquires the shelf ID "F21" from the HMD (S11 of FIG. 25). The first position acquisition section 4 then acquires the coordinate position (X5, Y8, Z2) of the goods specified by the shelf ID "F21" (S12). In this manner, a current goods position S2 is specified.

Then, the previous display data determination section 13 determines whether or not the display data 1 is stored in the storage unit 3 (S41 of FIG. 26). In this case, the display data 1 is stored (YES in S41), and hence the processing proceeds to S42.

Then, the shelf determination processing section 14 determines in S42 whether or not the shelf ID acquired from the HMD matches the shelf ID of the related goods associated with the display data 1. Note that, the shelf determination processing section 14 acquires the shelf ID corresponding to the related goods from the position information DB 31 (see FIG. 3).

In this case, the customer shows an interest in the goods (another piece of goods) different from the related goods displayed on the informing unit 23 (see FIG. 10) and moves to the position in front of the another piece of goods on the second floor of the store. Therefore, the shelf ID acquired from the HMD does not match the shelf ID of the related goods associated with the display data 1 (NO in S42), and the processing proceeds to S14 (see FIG. 25).

Then, in S14, the second position acquisition section 6 acquires from the position information DB 31 (see FIG. 3) the position information on the related goods associated with the display data 1. In this case, the second position acquisition section 6 acquires the pieces of position information "X6, Y6, Z1" and "X9, Y7, Z2" on the goods ID "002" (shoe polish set), the position information "X6, Y8, Z1" on the goods ID "003" (shoe spray), and the position information "X3, Y5, Z1" on the goods ID "004" (shoelace). When the same goods (for example, "shoe polish set") are displayed at a plurality of positions, the second position acquisition section 6 acquires a plurality of pieces of position information associated with the goods.

Figure 27:
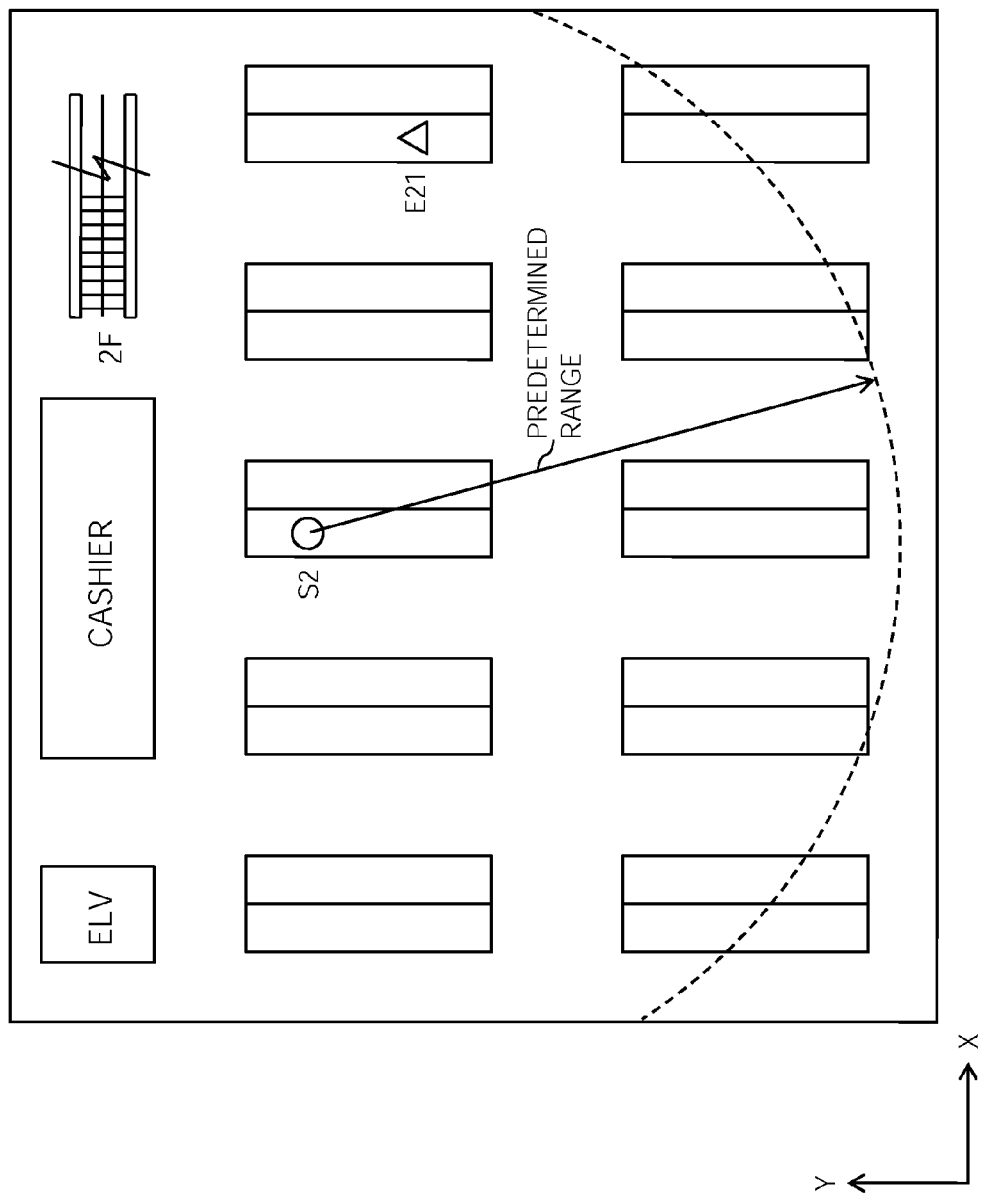
FIG. 27 is a diagram illustrating an example of the in-store map.

The processing in S15 to S21 to be executed subsequently is the same as that of the goods information providing processing of the first embodiment (see FIG. 7). Note that, it is assumed that a position E21 (position information: "X9, Y7, Z2") of the related goods "shoe polish set" (shelf ID: A18) exists within the above-mentioned predetermined range from the current goods position S2 as illustrated in FIG. 27. Thus, the related goods information image relating to the related goods "shoe polish set" (recommended goods) and the in-store map to which the position of the related goods "shoe polish set" is added are associated with each other to generate display data 2.

Note that, in S42, when the shelf ID acquired from the HMD matches the shelf ID of the related goods associated with the display data 1 (YES in S42), in other words, when the customer shows an interest in the related goods displayed on the informing unit 23 (see FIG. 10) and moves to the position in front of the position of the related goods (for example, "shoe spray") (shelf ID: A13), the shelf determination processing section 14 transmits, for example, a message indicating that the customer arrives at the related goods provided by the server 201 to the HMD via the communication unit 1 (S43). The shelf determination processing section 14 then deletes the display data 1 stored in the storage unit 3 (S44), and ends the processing (see FIG. 25). In this case, the following processing may also be executed. Specifically, the HMD recognizes the shelf ID of "A13" of the goods "shoe spray" and transmits the shelf ID to the server 201 so that the server 201 provides the goods information relating to the goods "shoe spray" (related goods information image and in-store map).

Further, in S41, when the display data 1 is not stored in the storage unit 3 (NO in S41), the processing proceeds to S13 of FIG. 25. The processing in S13 to S21 to be executed subsequently is the same as that of the goods information providing processing of the first embodiment (see FIG. 7). Note that, examples of the case where the display data 1 generated last time is not stored in the storage unit 3 include a case where the message indicating that the customer arrives at the display shelf (shelf ID: A13) of the related goods (for example, "shoe spray"), the information on which is provided by the server 201 in the goods information providing processing executed last time, is transmitted to the HMD and the display data 1 is deleted from the storage unit 3 and a case where the customer who has entered the store sees goods for the first time (where the HMD recognizes the goods). In this case, information relating to the related goods for the goods "PC" (related goods information image) and the in-store map to which the current goods position S2 and the position of the related goods are added are associated with each other to generate the display data 2.

<Goods Information Displaying Processing>

Next, a description is given of goods information displaying processing executed in the goods information providing system 500. The following case is also assumed here as in the above-mentioned goods information providing processing. Specifically, first, the above-mentioned goods information providing processing according to the first embodiment is executed on the server 201. Then, the related goods information image (see FIG. 10) and the in-store map (see FIG. 11) are associated with each other to generate the display data 1, and the generated display data 1 is transmitted to the customer terminal 400. Also assumed here is a case where, as illustrated in FIG. 27, the customer moves from, for example, the current goods position S1 (first floor) to the second floor and the another piece of goods (for example, "PC") catches his/her eyes, and the customer stops at the position of the another piece of goods "PC" (S2 of FIG. 27).

Figure 28:
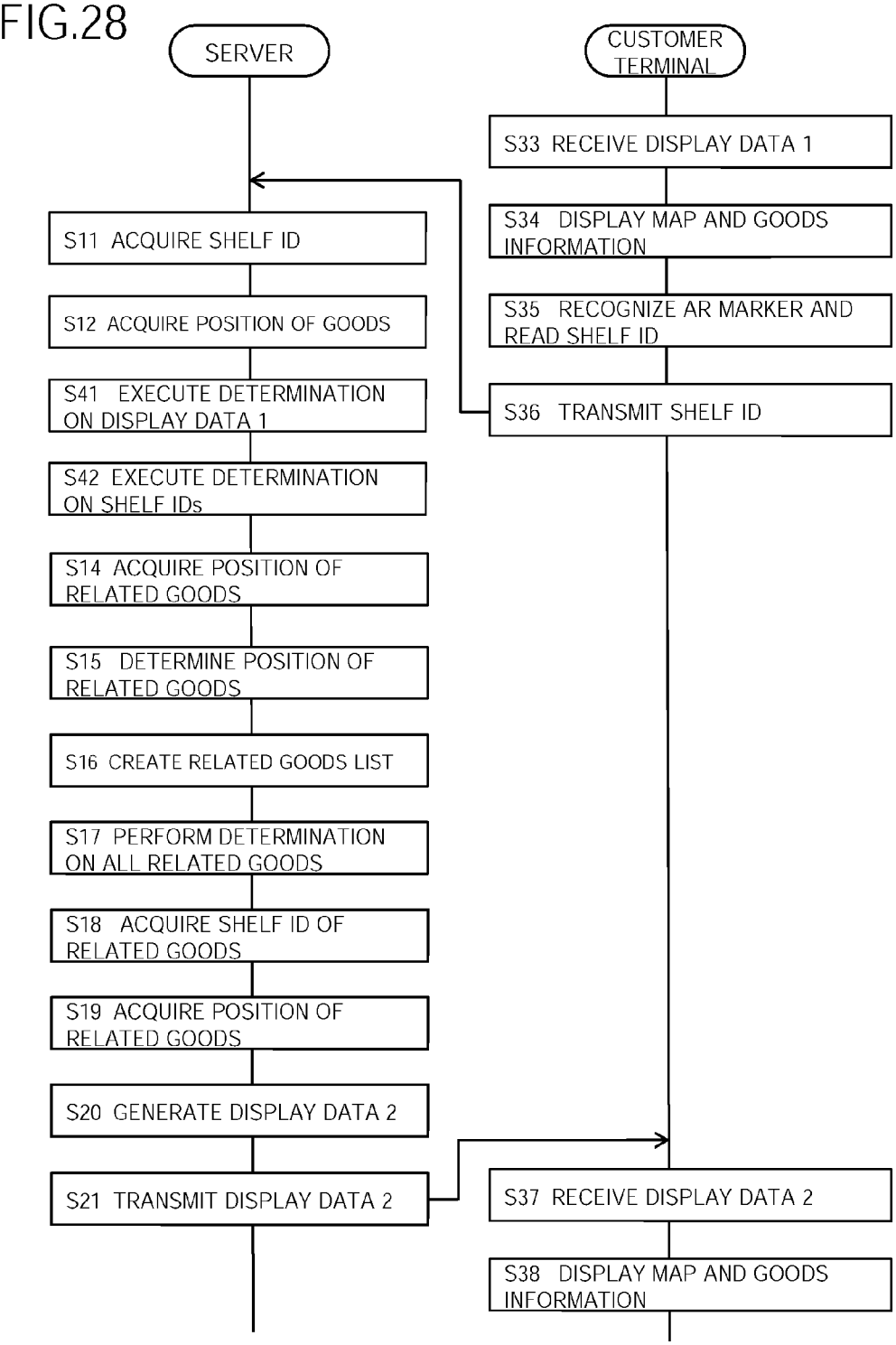
FIG. 28 is a flowchart illustrating a series of processing executed in the goods information providing system according to the second embodiment.

FIG. 28 illustrates a series of processing executed in the goods information providing system 500. Referring to FIG. 28, on the customer terminal 400 (HMD), after the processing in S33 and S34 (corresponding to S33 and S34 of FIG. 16), the related goods information image associated with the display data 1 (see FIG. 10) and the in-store map (see FIG. 11) are displayed on the informing unit 23. After that, when the customer stops in front of the another piece of goods "PC", the camera of the HMD recognizes the AR marker attached to the display shelf to read the shelf ID (S35).

Then, the HMD transmits the read shelf ID "F21" of the another piece of goods "PC" (goods ID: 011) to the server 201 (S36).

On the server 201 that has acquired the shelf ID of "F21" of the another piece of goods "PC", the above-mentioned goods information providing processing (see FIGS. 25 and 26) is executed and the related goods information image relating to the related goods "shoe polish set" and the in-store map to which the position of the related goods "shoe polish set" is added are associated with each other to generate the display data 2.

When receiving the display data 2 from the server 201 (S37), the HMD then stores the display data 2 in the storage unit 24 and displays the information corresponding to the display data 2 (related goods information image and in-store map) on the informing unit 23 (S38).

In this case, the information relating to the related goods "shoe polish set" (position E21, shelf ID "A18", and others) is displayed on the informing unit 23. FIG. 27 illustrates an example of the in-store map indicating the position E21 of the related goods "shoe polish set" which is displayed on the informing unit 23. With this, the customer can recognize the position of the related goods for the goods "shoes" that the customer sees at first after entering the store.

As described above, according to the goods information providing system 500 of the second embodiment, after the customer terminal 400 receives the display data 1 relating to the related goods for the desired goods by the customer, even when the customer moves to, for example, the position in front of the another piece of goods different from the related goods (when the customer terminal 400 recognizes the another piece of goods), the new position of the related goods is displayed when the same related goods are displayed in proximity to (within the predetermined range from) the current goods position (the position of the another piece of goods that the customer sees after moving).

Note that, in the goods information providing system 500 described above, when none of the related goods associated with the display data 1 ("shoe polish set", "shoe spray", and "shoelace") exists in proximity to (within the predetermined range from) the current goods position (the position of the another piece of goods that the customer sees after moving), the related goods ("PC software", "recording medium", "desk", and "chair") related to the goods displayed at the current goods position (the goods "PC" specified by the shelf ID "F21" newly acquired) may be extracted to generate the display data 2 based on the extracted related goods. In this manner, what is displayed on the informing unit 23 of the customer terminal 400 is switched from the related goods information on the goods "shoes" to the related goods information on the goods "PC."

According to the goods information providing system 500 of the second embodiment, which can provide the information on the related goods based on the customer's action, it is possible to further reduce a loss of the customer's opportunity to buy.

Third Embodiment

Figure 29:
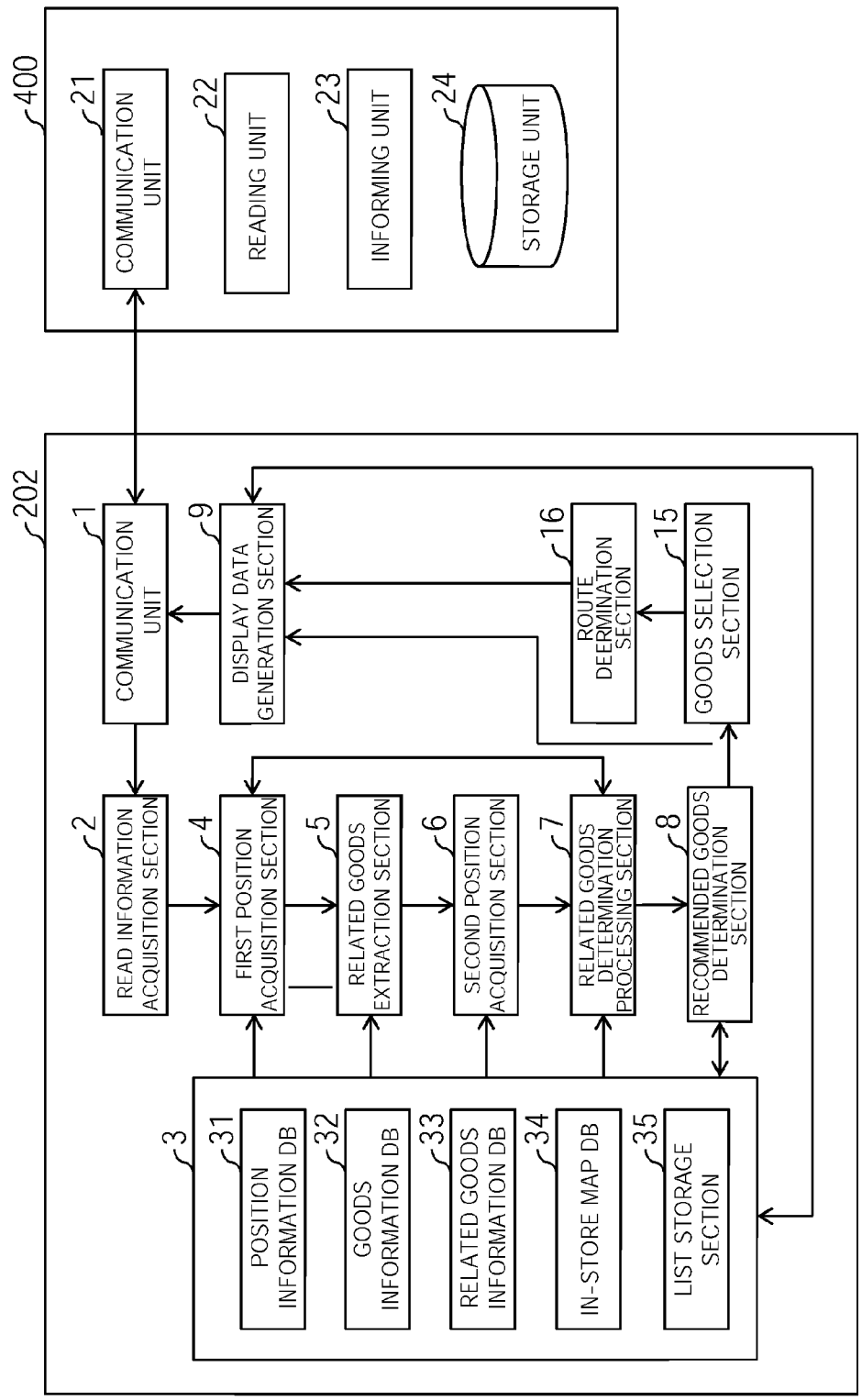
FIG. 29 is a block diagram illustrating a specific configuration of a goods information providing system according to the third embodiment of the present invention.

FIG. 29 is a diagram illustrating an example of a specific configuration of a goods information providing system 600 (see FIG. 1) according to a third embodiment of the present invention. In the goods information providing system 600, a server 202 further includes a goods selection section 15 (selection means) and a route determination section 16 (route determination means) in addition to the configuration of the server 200 described above in the first embodiment.

The goods selection section 15 selects (extracts) at least one specific related goods based on at least one of the goods (current goods) that the customer currently sees and the related goods (recommended goods) determined by the recommended goods determination section 8. For example, the goods selection section 15 may select the related goods extracted by the related goods extraction section 5 as the specific related goods, may select the related goods related to the recommended goods as the specific related goods, or may select as the specific related goods the related goods that can be bought with the use of the discount amount for the current goods from among the related goods extracted by the related goods extraction section 5 and the related goods related to the recommended goods. In a case where the goods selection section 15 is configured to select the specific related goods based on the discount amount, more specifically, for example, when the discount amount for the current goods is 1,500 yen and the price of the recommended goods is 1,000 yen, the goods selection section 15 selects the related goods that can be bought with the use of remaining 500 yen as the specific related goods. As described above, the goods selection section 15 may be the related goods extraction section 5 or may be a component for selecting the specific related goods by another method.

Based on the position of the current goods (current goods position X) acquired by the first position acquisition section 4 and a position Y of the related goods (recommended goods) acquired by the second position acquisition section 6, the route determination section 16 searches for a route from the current goods position X1 to the position Y of the recommended goods to determine a guidance route for guiding the customer. The route determination section 16 outputs the determined guidance route to the display data generation section 9. When acquiring information on the guidance route from the route determination section 16, the display data generation section 9 adds (displays) the acquired guidance route to (on) the in-store map. The route determination section 16 determines the optimal guidance route based on various conditions. In the following, a description is given of a specific configuration example of the route determination section 16.

Figure 30:
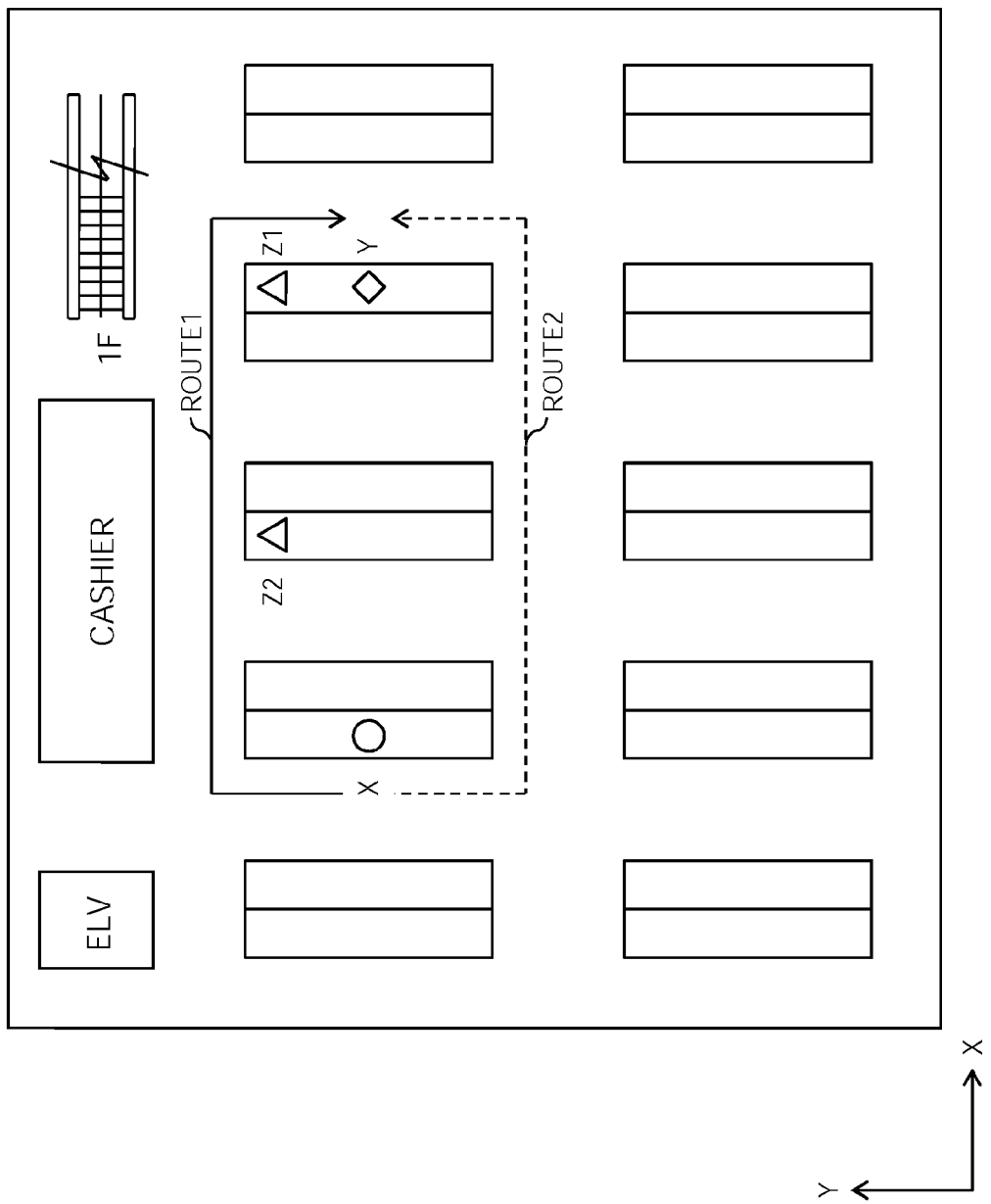
FIG. 30 is a diagram illustrating an example of the in-store map.

For example, when a plurality of routes are retrieved and the difference between the distances of the routes falls within a predetermined range, the route determination section 16 determines a route that passes through the largest number of positions of the specific related goods as the guidance route from among the plurality of routes. For example, as illustrated in FIG. 30, when two routes (routes 1 and 2) are retrieved as the route from the current goods position X to the position Y of the recommended goods and the difference (P1–P2) between the distance of the route 1 (moving distance P1) and the distance of the route 2 (moving distance P2) falls within the predetermined range, the route determination section 16 determines the route 1 on which the larger (largest) number of specific related goods (Z1 and Z2) selected by the goods selection section 15 are displayed as the guidance route from among the two routes. The predetermined range may be set to, for example, a range of 10% of the difference between the respective distances of the plurality of routes or less.

Modified Example 1

The route determination section 16 may search for the shortest route from the current goods position X to the position Y of the recommended goods to determine the guidance route. When there are a plurality of the recommended goods, the route determination section 16 searches for the shortest route for each of recommended goods to determine the guidance route for each of the recommended goods. The shortest route is calculated by, for example, measuring the linear distance or the distance indicating the moving route on the coordinate plane of the in-store map.

Modified Example 2

When a plurality of routes are retrieved as the route from the current goods position X to the position Y of the recommended goods, the route determination section 16 may determine a route that prompts the customer to make a detour to some degree (for example, the route whose distance is longer than that of the shortest route by 10%) as the guidance route. The route determination section 16 may also determine, for example, a route different from the route to which the customer is guided before as the guidance route.

Modified Example 3

When a plurality of routes are retrieved as the route from the current goods position X to the position Y of the recommended goods, the route determination section 16 may determine the guidance route based on a purchase history of the customer. Also in this case, the route determination section 16 may determine, for example, the route different from the route to which the customer is guided before as the guidance route. Note that, the goods selection section 15 of the server 202 may be omitted in the goods information providing system 600 according to each of Modified Examples 1 to 3 described above.

Note that, in each of the embodiments described above, the shelf identification information (shelf ID) for specifying the display shelf on which the goods are displayed has been described as the specifying information for specifying the goods and its position, but the present invention is not limited thereto. For example, the goods identification information (goods ID) for specifying the goods may be used as the specifying information. In this case, the position information DB 31 of FIG. 3 may be used. Alternatively, the shelf position information (position information) for specifying the position of the display shelf on which the goods are displayed or the goods position information (position information) for specifying the position of the goods may be used as the specifying information. In this case, the position information on the goods may be acquired directly from the customer terminal without referring to the position information DB 31 of FIG. 3.

As another example, in the goods information providing system according to each of the embodiments described above, the related goods determination processing section 7 may be configured to determine the related goods so that, when information on the related goods is once provided to the customer during a period from when the customer enters the store to when the customer exits the store, the information is not provided again to the customer. This configuration may be implemented as follows, for example. Specifically, display data generated in the period from when the customer enters the store to when the customer exits the store is stored in the storage unit 3. The related goods determination processing section 7 then compares the related goods associated with the stored display data with the related goods associated with display data to be newly generated and is extracted by the related goods extraction section 5. When those related goods are identical, the information on the related goods is prevented from being provided to the customer.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A goods information providing system, comprising:
a reading device configured to read, from a non-transitory information readable medium disposed along with goods in a real store, specifying information that specifics the goods and a position of the goods;
at least one non-transitory memory configured to store program code;
at least one processor configured to read the program code and operate as instructed by the program code, the program code including:
first position acquisition code that causes the at least one processor to acquire, from a position information storage configured to store the specifying information, identification information of the goods, and position information of the goods in association with each other, the position information of the goods disposed close to a customer and specified by the specifying information read by the reading device;
related goods extraction code that causes the at least one processor to extract, from a related goods information storage configured to store the identification information of the goods and a plurality of respective pieces of identification information of a plurality of related goods related to the goods in association with each other, the plurality of respective pieces of identification information of the plurality of related goods related to the goods specified by the specifying information read by the reading device;
second position acquisition code that causes the at least one processor to acquire, after the related goods extraction code extracts the plurality of respective pieces of identification information of the plurality of related goods, a plurality of pieces of position information that are respectively associated with the plurality of pieces of identification information of the plurality of related goods extracted by the related goods extraction code from the position information storage; and
recommended goods determination code that causes the at least one processor to determine, after the second position acquisition code acquires the plurality of respective pieces of position information of the plurality of related goods, as recommended goods, from among the plurality of related goods that are respectively identified by the plurality of pieces of identification information extracted by the related goods extraction code, the related goods selected based on the position of the goods disposed close to a customer and corresponding to the position information acquired by the first position acquisition code and positions of the plurality of related goods respectively corresponding to the plurality of pieces of position information acquired by the second position acquisition code; and
an informing device configured to inform of information about the recommended goods determined by the recommended goods determination code.

2. The goods information providing system according to claim 1, wherein the recommended goods determination code further causes the at least one processor to determine, as the recommended goods, from among a plurality of the selected related goods, the related goods selected based on relative positions of the plurality of the selected related goods in the real store.

3. The goods information providing system according to claim 1, wherein the recommended goods determination code further causes the at least one processor to determine, as the recommended goods, from among a plurality of the selected related goods, one of the related goods disposed in proximity to one another in the real store and related goods disposed in a region in the real store in which the related goods are distributed with a highest density.

4. The goods information providing system according to claim 1, wherein the recommended goods determination code further causes the at least one processor to determine, as the recommended goods, from among the selected related goods, the related goods having a price equal to or lower than a discount amount of the goods specified by the specifying information.

5. The goods information providing system according to claim 1, wherein, after the informing device informs of the information about the recommended goods, when the reading device reads second specifying information that specifies another piece of goods different from the recommended goods and a position of the another piece of goods from an information readable medium disposed along with the another piece of goods:
   the first position acquisition code causes the at least one processor to acquire position information of the another piece of goods that is specified by the second specifying information read by the reading device from the position information storage;
   the second position acquisition code causes the at least one processor to acquire position information of the recommended goods from the position information storage; and
   the recommended goods determination code causes the at least one processor to determine, as a new recommended goods, from among the recommended goods, the related goods selected based on the position of the another piece of goods corresponding to the position information acquired by the first position acquisition code and a position of the recommended goods corresponding to the position information acquired by the second position acquisition code.

6. The goods information providing system according to claim 1, wherein in the related goods information storage, the plurality of related goods are registered in advance based on a purchase history of a customer.

7. The goods information providing system according to claim 1, wherein the recommended goods determination code causes the at least one processor to select, from among the plurality of related goods that are each identified by the plurality of respective pieces of identification information extracted by the related goods extraction code, the related goods to be determined as the recommended goods based on one of a linear distance and a distance from the position of the goods corresponding to the position information acquired by the first position acquisition code to the positions of the plurality of related goods respectively corresponding to the plurality of pieces of position information acquired by the second position acquisition code.

8. The goods information providing system according to claim 1, wherein the informing device displays an in-store map indicating the position of the goods specified by the specifying information and a position of the recommended goods determined by the recommended goods determination code.

9. The goods information providing system according to claim 1, further comprising:
   route determination code that causes the at least one processor to search for a route from the position of the goods specified by the specifying information to a position of the recommended goods based on the position of the goods and the position of the recommended goods to determine a guidance route; and
   selection code that causes the at least one processor to select at least one specific related goods based on at least one of the goods and the recommended goods,
   wherein:
   the route determination code causes the at least one processor to determine, when a plurality of routes are retrieved as the route and a difference between distances of the plurality of routes falls within a predetermined range, the route passing through a largest number of positions of the at least one specific related goods as the guidance route, from among the plurality of routes; and
   the informing device is further configured to display an in-store map indicating the guidance route determined by the route determination code.

10. The goods information providing system according to claim 1, wherein the information readable medium comprises any one of a barcode, a QR code, and an AR marker, and is disposed for each of goods on a display shelf on which the each of the goods is displayed.

11. The goods information providing system according to claim 1, wherein the specifying information comprises goods position information that specifies the position of the goods in the real store.

12. The goods information providing system according to claim 1, wherein the relation between the identification information of the goods and the plurality of respective pieces of identification information of the plurality of related goods is set based on a purchase history of a plurality of customers.

13. A goods information providing apparatus, which is to be connected via a network to a portable information terminal device configured to be used by a customer who visits a real store selling goods, the goods information providing apparatus comprising:
   a reception device configured to receive specifying information from the portable information terminal device that has read, from a non-transitory information readable medium disposed along with the goods in the real store, the specifying information specifying the goods and a position of the goods;
   at least one non-transitory memory configured to store program code;
   at least one processor configured to read the program code and operate as instructed by the program code, the program code including:
      first position acquisition code that causes the at least one processor to acquire, from a position information storage configured to store the specifying information, identification information of the goods, and position information of the goods in association with each other, the position information of the goods disposed close to a customer and specified by the specifying information;

related goods extraction code that causes the at least one processor to extract, from a related goods information storage configured to store the identification information of the goods and a plurality of respective pieces of identification information of a plurality of related goods related to the goods in association with each other, the plurality of respective pieces of identification information of the plurality of related goods related to the goods specified by the specifying information;

second position acquisition code that causes the at least one processor to acquire, after the related goods extraction code extracts the plurality of respective pieces of identification information of the plurality of related goods, a plurality of pieces of position information that are respectively associated with the plurality of pieces of identification information of the plurality of related goods extracted by the related goods extraction code from the position information storage; and recommended goods determination code that causes the at least one processor to determine, after the second position acquisition code acquires the plurality of respective pieces of position information of the plurality of related goods, as recommended goods, from among the plurality of related goods that are respectively identified by the plurality of pieces of identification information extracted by the related goods extraction code, the related goods selected based on the position of the goods disposed close to a customer and corresponding to the position information acquired by the first position acquisition code and positions of the plurality of related goods respectively corresponding to the plurality of pieces of position information acquired by the second position acquisition code; and a transmission device configured to transmit, to the portable information terminal device, informing data that informs of information about the recommended goods.

14. A goods information providing method, comprising:

reading, from a non-transitory information readable medium disposed along with goods in a real store, specifying information that specifies the goods and a position of the goods;

acquiring, from a position information storage configured to store the specifying information, identification information of the goods, and position information of the goods in association with each other, first position information of the goods disposed close to a customer and specified by the specifying information;

extracting, from a related goods information storage configured to store the identification information of the goods and a plurality of respective pieces identification information of a plurality of related goods related to the goods in association with each other, the plurality of respective pieces of the identification information of the plurality of related goods related to the goods specified by the specifying information;

acquiring, after the extracting the plurality of respective pieces of identification information of the plurality of related goods, a plurality of pieces of second position information that are respectively associated with the plurality of pieces of identification information of the plurality of related goods from the position information storage;

determining, after the acquiring the plurality of respective pieces of second position information of the plurality of related goods, as recommended goods, from among the plurality of related goods that are respectively identified by the plurality of pieces of identification information extracted in the extracting, the related goods selected based on the position of the goods disposed close to a customer and corresponding to the first position information and positions of the plurality of related goods respectively corresponding to the plurality of pieces of second position information; and informing of information about the recommended goods.

15. A non-transitory computer-readable storage medium having stored thereon a goods information providing program that causes a computer to:

acquire, from a position information storage configured to store the specifying information, identification information of the goods, and position information of the goods in association with each other, first position information of goods disposed close to a customer and specified by specifying information that specifies the goods and a position of the goods, the specifying information being included in a non-transitory information readable medium disposed along with the goods in a real store;

extract, from a related goods information storage configured to store the identification information of the goods and a plurality of respective pieces of identification information of a plurality of related goods related to the goods in association with each other, the plurality of respective pieces of identification information of the plurality of related goods related to the goods specified by the specifying information;

acquire, after the computer extracts the plurality of respective pieces of identification information of the plurality of related goods, a plurality of pieces of second position information that are respectively associated with the plurality of pieces of extracted identification information of the plurality of related goods from the position information storage; and determine, after the computer acquires the plurality of respective pieces of second position information of the plurality of related goods, as recommended goods, from among the plurality of related goods that are identified by the plurality of pieces of extracted identification information, the related goods selected based on the position of the goods disposed close to a customer and corresponding to the acquired first position information and positions of the plurality of related goods respectively corresponding to the plurality of pieces of acquired second position information.

* * * * *